United States Patent
Merritt, Jr.

(10) Patent No.: US 9,957,161 B2
(45) Date of Patent: May 1, 2018

(54) POLYGENERATION PRODUCTION OF HYDROGEN FOR USE IN VARIOUS INDUSTRIAL PROCESSES

(71) Applicant: Grannus LLC, Tucson, AZ (US)

(72) Inventor: James Kelly Merritt, Jr., Lafayette, OR (US)

(73) Assignee: Grannus, LLC, Tuscon, AZ (US)

( * ) Notice: Subject to any disclaimer, the term of this patent is extended or adjusted under 35 U.S.C. 154(b) by 0 days. days.

(21) Appl. No.: 15/368,623

(22) Filed: Dec. 4, 2016

(65) Prior Publication Data

US 2017/0158504 A1 Jun. 8, 2017

Related U.S. Application Data

(60) Provisional application No. 62/263,531, filed on Dec. 4, 2015, provisional application No. 62/263,408, filed
(Continued)

(51) Int. Cl.
*C01B 32/50* (2017.01)
*C01B 3/36* (2006.01)
(Continued)

(52) U.S. Cl.
CPC ............ *C01B 3/48* (2013.01); *B01D 53/047* (2013.01); *B01D 53/1425* (2013.01); *B01D 53/1475* (2013.01); *B01D 53/265* (2013.01); *C01B 3/36* (2013.01); *C01B 3/56* (2013.01); *C01B 32/50* (2017.08); *C01C 1/0405* (2013.01);
(Continued)

(58) Field of Classification Search
CPC ......... C07C 273/10; C01B 3/025; C01B 3/36; C01B 3/586; C01B 3/583; C01B 2203/025; C01B 3/42; C01B 2203/0415; C01B 2203/044; C01B 2203/047; C01B 2203/0475; C01B 2203/068; C01B 2203/147; C01B 2203/1235; B01D 53/1475; B01D 53/1431; B01D 53/002; C10G 2/32
See application file for complete search history.

(56) References Cited

U.S. PATENT DOCUMENTS 3,743,699 A 7/1973 Bogart
4,320,103 A 3/1982 Pagani
(Continued)

FOREIGN PATENT DOCUMENTS

GB 1104628 A 9/1964
WO 03027062 A1 4/2003
(Continued)

OTHER PUBLICATIONS

Cardinal Intellectual Property, Patent Search Report, Freedom to Operate, Simplified Low Energy Amine Unit, Mar. 6, 2017, Cardinal Reference No. 3255.110; Cardinal Project Manager: Justin Piper, 13 Pages.
(Continued)

*Primary Examiner* — Jafar Parsa
(74) *Attorney, Agent, or Firm* — Dentons US LLP

(57) ABSTRACT

Provided are processes for production of hydrogen to be used in various industrial processes, including in processes for production of ammonia and urea. Included are polygeneration processes that result in ultra-low emissions.

20 Claims, 6 Drawing Sheets

Related U.S. Application Data on Dec. 4, 2015, provisional application No. 62/296,058, filed on Feb. 16, 2016.

(51) Int. Cl.

| | |
|---|---|
| *C01B 3/48* | (2006.01) |
| *B01D 53/14* | (2006.01) |
| *B01D 53/26* | (2006.01) |
| *C10G 2/00* | (2006.01) |
| *B01D 53/047* | (2006.01) |
| *C01C 1/04* | (2006.01) |
| *C01B 3/56* | (2006.01) |

(52) U.S. Cl.
CPC .......... *C10G 2/30* (2013.01); *B01D 2252/204* (2013.01); *B01D 2256/16* (2013.01); *C01B 2203/0255* (2013.01); *C01B 2203/0261* (2013.01); *C01B 2203/0288* (2013.01); *C01B 2203/042* (2013.01); *C01B 2203/0415* (2013.01); *C01B 2203/0425* (2013.01); *C01B 2203/0465* (2013.01); *C01B 2203/0475* (2013.01); *C01B 2203/0495* (2013.01); *C01B 2203/062* (2013.01); *C01B 2203/068* (2013.01); *C01B 2203/127* (2013.01); *C01B 2203/1235* (2013.01); *C01B 2203/1258* (2013.01); *C01B 2203/146* (2013.01)

(56) References Cited

U.S. PATENT DOCUMENTS

| | | | |
|---|---|---|---|
| 4,553,981 | A | 11/1985 | Fuderer |
| 4,572,829 | A | 2/1986 | Fuderer |
| 4,671,893 | A | 6/1987 | Pinto |
| 4,690,812 | A | 9/1987 | Ranke et al. |
| 4,725,380 | A | 2/1988 | Pinto |
| 4,869,887 | A | 9/1989 | Van Dijk |
| 5,076,837 | A | 12/1991 | Rathbone et al. |
| 5,152,975 | A | 10/1992 | Fong et al. |
| 5,185,139 | A | 2/1993 | Krishnamurthy et al. |
| 5,603,908 | A | 2/1997 | Yoshida et al. |
| 5,720,785 | A | 2/1998 | Baker |
| 5,741,474 | A | 4/1998 | Isomura et al. |
| 6,011,073 | A | 1/2000 | Agee |
| 6,083,425 | A | 7/2000 | Clawson et al. |
| 6,165,433 | A | 12/2000 | Chakravarti et al. |
| 6,231,827 | B1 | 5/2001 | Pagani |
| 6,340,451 | B1 | 1/2002 | Pagani et al. |
| 6,379,586 | B1 | 4/2002 | Zeng et al. |
| 6,448,441 | B1 | 9/2002 | Wing-Chiu et al. |
| 6,623,537 | B1 | 9/2003 | Jahnke |
| 6,696,026 | B2 | 2/2004 | Pagani et al. |
| 6,797,252 | B2 | 9/2004 | Wang et al. |
| 6,929,668 | B2 | 8/2005 | Millet et al. |
| 7,332,146 | B1 | 2/2008 | Huang et al. |
| 7,442,349 | B2 | 10/2008 | Reddy et al. |
| 7,470,415 | B2 | 12/2008 | Davey et al. |
| 7,781,695 | B2 | 8/2010 | Blutke et al. |
| 8,012,446 | B1 | 9/2011 | Wright et al. |
| 8,057,773 | B2 | 11/2011 | MacArthur et al. |
| 8,460,630 | B2 | 6/2013 | Niitsuma et al. |
| 8,529,864 | B2 | 9/2013 | Huang et al. |
| 8,545,727 | B2 | 10/2013 | Filippi et al. |
| 8,591,770 | B2 | 11/2013 | Filippi et al. |
| 8,637,299 | B2 | 1/2014 | Heichberger |
| 8,911,519 | B2 | 12/2014 | Niitsuma et al. |
| 9,139,431 | B2 | 9/2015 | Panza |
| 9,242,859 | B2 | 1/2016 | Molinari et al. |
| 9,260,303 | B2 | 2/2016 | Filippi et al. |
| 9,340,494 | B2 | 5/2016 | Iaquaniello et al. |
| 9,458,024 | B2 | 10/2016 | Merritt |
| 2002/0055545 | A1 | 5/2002 | Sheppard |
| 2004/0028595 | A1 | 2/2004 | Davey et al. |
| 2007/0256361 | A1 | 11/2007 | Kindig |
| 2008/0134666 | A1 | 6/2008 | Kulkarni et al. |
| 2009/0064582 | A1 | 3/2009 | Malhotra |
| 2009/0121191 | A1 | 5/2009 | Tillman |
| 2010/0047158 | A1 | 2/2010 | Borresen et al. |
| 2010/0107607 | A1 | 5/2010 | Kopp |
| 2010/0132259 | A1 | 6/2010 | Hague |
| 2010/0205856 | A1 | 8/2010 | Kubic |
| 2010/0251613 | A1 | 10/2010 | Thacker et al. |
| 2010/0303703 | A1 | 12/2010 | Filippi |
| 2011/0209494 | A1 | 9/2011 | Nelson |
| 2011/0250119 | A1 | 10/2011 | Mello et al. |
| 2012/0000243 | A1 | 1/2012 | Bough et al. |
| 2012/0202897 | A1* | 8/2012 | Keskinen ............ B01D 53/1406 518/702 |
| 2012/0301391 | A1 | 11/2012 | Basini et al. |
| 2013/0039835 | A1 | 2/2013 | Ostuni et al. |
| 2013/0097929 | A1* | 4/2013 | Pham ..................... C01B 3/384 48/198.7 |
| 2014/0120023 | A1 | 5/2014 | Singh et al. |
| 2014/0332405 | A1 | 11/2014 | Tamhankar et al. |
| 2015/0014596 | A1 | 1/2015 | Filippi et al. |
| 2015/0197425 | A1 | 7/2015 | Hayashi et al. |
| 2015/0291438 | A1 | 10/2015 | Merritt |
| 2016/0060537 | A1 | 3/2016 | Hsu |
| 2017/0001862 | A1 | 1/2017 | Manousiouthakis et al. |

FOREIGN PATENT DOCUMENTS

| | | |
|---|---|---|
| WO | 2003027062 A1 | 4/2003 |
| WO | 2005033003 A1 | 4/2005 |
| WO | 2005123588 A1 | 12/2005 |
| WO | 2007134075 A2 | 11/2007 |
| WO | 2009079681 A1 | 7/2009 |
| WO | 2011008900 A1 | 1/2011 |
| WO | 2013124092 A1 | 8/2013 |

OTHER PUBLICATIONS

Liu, et al. Application of Chemical looping process for continuous high purity hydro thermocatalytic decomposition; Mar. 2, 2016;4592-4602, 5 Pages, Proquest Dialog.

Lederer, et al. Hydrogen or Soot? Partial Oxidation of High-boiling Hydrocarbon Wastes; Feb. 28, 2015; Chem. Biochem. Eng. Q., 29 (1) 5-11 (2015).

Patent CN103193371B—Method and device for sludge oxidation by supercritical water , 2013.

Edward S. Rubin et al.; Development and Application of Optimal Design Capability for Coal Gasification Systems; Technical Documentation: Oxygen-based Combustion Systems (Oxyfuels) with Carbon Capture and Storage (CCS); Work Performed Under Contract No. DE-AC21-92MC29094, Reporting Period Start, Oct. 2003, Reporting Period End, May 2007; Report submitted May 2007.

Toon Van Harmelen et al.; The Impacts of CO2 Capture Technologies on Transboundary Air Pollution in the Netherlands; Reference No. BOLK; Number of pp. 15 (incl. appendices), Number of appendices 4; May 2008.

Nexant Chem Systems; Multi-Client Study Prospectus, Polygeneration from Coal, Integrated Power, Chemicals and Liquid Fuels; pp. 1-45; Jul. 2008.

International Joural of Hydrogen Energy, Hydrogen production with CO2 capture; vol. 41, Issue 9, Mar. 9, 2016, pp. 4969-4992.

Verma, Priyanshu,et al. Overview of Biogas Reforming Technologies for Hydrogen Production: Advantages and Challenges. Chapter: Proceedings of the First International Conference on Recent Advances in Bioenergy Research; part of the series Springer Proceedings in Energy, pp. 227-243. Apr. 26, 2016.

Wikipedia, "Amine Gas Treating", Jun. 3, 2015, pp. 1-4, Retrieved from the Internet: <URL: "https://en.wikipedia.org/w/index.php?title=amine_gas-treating&oldid=665304311">, p. 1, 3.

International Search Report issued in International Application No. PCT/US2016/64875 dated May 1, 2017.

(56) References Cited

OTHER PUBLICATIONS

Written Opinion of the International Search Report issued in International Application No. PCT/US2016/64875 dated May 1, 2017.

* cited by examiner

POLYGENERATION PRODUCTION OF HYDROGEN FOR USE IN VARIOUS INDUSTRIAL PROCESSES

This application claims priority to, and the benefit of, U.S. Provisional Application No. 62/263,531, filed on Dec. 4, 2015, U.S. Provisional Application No. 62/263,408, filed on Dec. 4, 2015, and U.S. Provisional Application No. 62/296,058, filed on Feb. 16, 2016.

FIELD OF THE INVENTION

The present disclosure relates to a process for the production of hydrogen for use in various industrial processes, such as in processes for production of ammonia and/or nitrogen based fertilizers, or synthetic fuels. More specifically, the invention relates to a polygeneration process for the production of hydrogen from a gas stream using an oxygen supplied, partial oxidation ("POX") industrial process, wherein the overall process may result in the net production of recoverable and salable power and limited emissions.

BACKGROUND

Hydrogen is used in a number of industrial processes. For instance, hydrogen is used for: production of ammonia and subsequently urea, urea and ammonium nitrate, nitric acids, and diesel exhaust fluids; various Fischer-Tropsch processes; production of mixed alcohols; production of aldehyde alcohols; production of ethanol; and production of methanol and subsequently ethanol, methyl tert-butyl ether, acetic acid, olefins, synthetic diesel, gasoline, gasoline additives (e.g. M100, M85), and dimethyl ether.

One of the most common uses of hydrogen is in industrial process for production of ammonia and urea. Nitrogen is an important nutrient for supporting development and growth of plant life. Urea and ammonia are two common nitrogen containing compounds that are widely used in the fertilizer industry, as well as being used as basic chemicals in the production of a variety of different chemical compounds.

Ammonia is a precursor to many nitrogen containing compounds, including urea, and therefore is an important chemical to the fertilizer industry. Because of its many uses, ammonia is one of the most highly produced inorganic compounds, typically enjoying worldwide production in excess of 100 million tons. Of the ammonia produced, approximately 80% or more of the ammonia is utilized for the fertilization of agricultural crops.

Urea (or carbamide) is an organic compound having the chemical formula NH2CONH2. More than 90% of the world production of urea is for use in fertilizers as urea has the highest nitrogen content of all commonly used solid nitrogenous fertilizers. Due to the wide use of urea in fertilizers as a convenient source of nitrogen, urea production is important. Additionally, urea is an important feedstock for the manufacturing of plastics, resins, glues, and pharmaceuticals, and is also important as a feed product for ruminant animals.

Generally, industrial plants producing urea and urea based fertilizers suffer from high feedstock costs, excessive energy requirements, and high emissions. Thus, a need exists for the development of new methods for the production of hydrogen used to make urea and nitrogen based fertilizers which reduce costs and emissions. Similar needs exist for hydrogen production for other industrial processes, including various Fischer-Tropsch processes; processes for production of mixed alcohols; processes for production of aldehyde alcohols; processes for production of ethanol; and processes for production of methanol and subsequently ethanol, methyl tert-butyl ether, acetic acid, olefins, synthetic diesel, gasoline, gasoline additives (e.g. M100, M85), and dimethyl ether

SUMMARY

Disclosed herein are methods and systems addressing the shortcomings of the art, and may provide any number of additional or alternative advantages. Specifically described herein are systems and methods for production of hydrogen.

Aspects of the present disclosure provide a method for the production of hydrogen from synthesis gases of an oxygen supplied partial oxidation process. The method includes the steps of: supplying a hydrocarbon or carbonaceous feedstock and oxygen to an oxygen supplied partial oxidation process to produce a synthesis gas, the synthesis gas comprising carbon dioxide, carbon monoxide, and hydrogen; supplying the synthesis gas to a first reactor, the first reactor comprising a catalyst and is to convert at least a portion of the carbon monoxide to carbon dioxide and produce a modified synthesis gas; supplying the modified synthesis gas to a second reactor, the second reactor comprising a catalyst configured to convert remaining carbon monoxide to carbon dioxide to produce a carbon dioxide-rich synthesis gas; supplying the carbon dioxide-rich synthesis gas from the second reactor to a first condenser to remove water and produce a gas stream comprising hydrogen and carbon dioxide; supplying the hydrogen and carbon dioxide stream to a pressure swing adsorption process to produce a pure hydrogen stream and pressure swing adsorption tail gas; and extracting exothermic heat for the production of power, heating and cooling of the process, or export of steam.

In certain embodiments, the method further includes the step of supplying the pure hydrogen stream and nitrogen gas from an air separation unit to a fourth reactor, the fourth reactor comprising a catalyst and is configured to produce an ammonia product stream. In further embodiments, the method further includes the step of utilizing a hydrogen generator, wherein the hydrogen generator produces hydrogen and oxygen from a water feedstock, wherein the hydrogen is supplied to the fourth reactor and the oxygen is supplied to the oxygen supplied partial oxidation process. In yet further embodiments, the method includes the step of utilizing an ammonia refrigeration unit cold gas exit temperature for a heat sink.

In certain embodiments, the method further includes the step of supplying the pure hydrogen stream to a Fischer Tropsch gas to liquids process. In certain embodiments, the method further includes the step of supplying the synthesis gas or modified synthesis gas to a soot removal process to remove to remove soot. In certain embodiments, the method further includes the step of supplying at least one of the hydrocarbon or carbonaceous feedstock, the synthesis gas, or the modified synthesis gas to a desulfurization process.

In certain embodiments, the method further includes the step of supplying the gas stream comprising hydrogen and carbon dioxide to an amine separator unit to produce a residual pure carbon dioxide stream and amine treated high hydrogen content stream. In further embodiments, the amine separator unit is a multi-pressure system with one or more carbon dioxide outputs and one or more amine regeneration processes.

In certain embodiments, the method further includes the step of supplying the gas stream comprising hydrogen and carbon dioxide from the first condenser to a vacuum pressure swing adsorption process to produce a pure carbon dioxide stream and a high hydrogen content stream.

In certain embodiments, the method further includes the step of supplying the pure hydrogen stream to a third reactor, the third reactor having a catalyst and is configured for the production methane from the minor amounts of carbon monoxide and carbon dioxide present in the hydrogen stream, the third reactor producing a methane product stream and a high purity hydrogen stream.

In certain embodiments, the oxygen has a purity of at least 93%. In further embodiments, the composition of the gas stream containing hydrogen and carbon dioxide has between 65-80% hydrogen, between 20-35% carbon dioxide and between 0-8% carbon monoxide.

In further embodiments, the first and second reactor are replaced with one or three reactors.

In further embodiments, at least one gas or tail gas is purged to atmosphere, a fuel cell, or a thermal oxidizer.

In certain embodiments, the method further includes the step of supplying the pure hydrogen stream to a process selected from the group consisting of a process for the production of urea, ammonium nitrate, nitric acids, diesel exhaust fluids, mixed alcohols; production of aldehyde alcohols, ethanol, methanol, methyl tert-butyl ether, acetic acid, olefins, synthetic diesel, gasoline, gasoline additives, and dimethyl ether.

In certain embodiments, the method further includes the step of supplying the gas stream comprising hydrogen and carbon dioxide to a wash system to decrease concentration of ammonia and hydrogen cyanide in the gas stream comprising hydrogen and carbon dioxide to below 5 parts per million by volume.

In certain embodiments, the method further includes the step of recycling the water removed by the first condensor.

In certain embodiments, the method further includes the step of utilizing an air separation unit to allow for cold gases within the method to be used as a heat sink in the method.

The present disclosure provides a method for the production of hydrogen from synthesis gases of an oxygen supplied partial oxidation process. The method includes the steps of: supplying a hydrocarbon or carbonaceous feedstock and oxygen to an oxygen supplied partial oxidation process to produce a synthesis gas, the synthesis gas includes carbon dioxide, carbon monoxide, and hydrogen; supplying the synthesis gas to a first reactor, the first reactor includes a catalyst and is configured to convert at least a portion of the carbon monoxide to carbon dioxide and produce a modified synthesis gas; supplying the modified synthesis gas to a second reactor, the second reactor includes a catalyst and is configured to convert remaining carbon monoxide to carbon dioxide to produce a carbon dioxide-rich synthesis gas; supplying the carbon dioxide-rich synthesis gas from the second reactor to a first condenser to remove water and produce a gas stream includes hydrogen and carbon dioxide; supplying the gas stream includes hydrogen and carbon dioxide from the first condenser to a vacuum pressure swing adsorption process to produce a pure carbon dioxide stream and a high hydrogen content stream; supplying the high hydrogen content stream to a pressure swing adsorption process to produce a pure hydrogen stream and pressure swing adsorption tail gas; and supplying the pure hydrogen stream to an optional third reactor, the third reactor includes a catalyst and is configured for the production methane from the minor amounts of carbon monoxide and carbon dioxide present in the hydrogen stream, the third reactor producing a methane product stream and a high purity hydrogen stream.

Also provided is a method for the production of hydrogen from synthesis gases of an oxygen supplied partial oxidation process. The method includes the steps of: supplying a hydrocarbon or carbonaceous feedstock and oxygen to an oxygen supplied partial oxidation process to produce a synthesis gas, the synthesis gas includes carbon dioxide, carbon monoxide, and hydrogen; supplying the synthesis gas to a first reactor, the first reactor includes a catalyst and is configured to convert at least a portion of the carbon monoxide to carbon dioxide and produce a modified synthesis gas; supplying the modified synthesis gas to a second reactor, the second reactor includes a catalyst and is configured to convert remaining carbon monoxide to carbon dioxide to produce a carbon dioxide-rich synthesis gas; supplying the carbon dioxide-rich synthesis gas from the second reactor to a first condenser to remove water and produce a gas stream that includes hydrogen and carbon dioxide; supplying the gas stream that includes hydrogen and carbon dioxide from the first condenser to a vacuum pressure swing adsorption process to produce a pure carbon dioxide stream and a high hydrogen content stream; supplying the high hydrogen content stream to an amine separator unit to produce a residual pure carbon dioxide stream and amine treated high hydrogen content stream; supplying the amine treated high hydrogen content stream to a pressure swing adsorption process to produce a pure hydrogen stream and pressure swing adsorption tail gas; and supplying the pure hydrogen stream to an optional third reactor, the third reactor includes a catalyst and is configured for the production of methane from the minor amounts of carbon monoxide and carbon dioxide present in the hydrogen stream, the third reactor producing a methane product stream and a high purity hydrogen stream.

In another embodiment, provided is a method for the production of hydrogen from synthesis gases of an oxygen supplied partial oxidation process. The method includes the steps of: supplying a hydrocarbon or carbonaceous feedstock and oxygen to an oxygen supplied partial oxidation process to produce a synthesis gas, the synthesis gas includes carbon dioxide, carbon monoxide, and hydrogen; supplying the synthesis gas to a first reactor, the first reactor includes a catalyst and is configured to convert at least a portion of the carbon monoxide to carbon dioxide and produce a modified synthesis gas, the first reactor also being a medium temperature water gas shift reactor or isothermal reactor; supplying the modified synthesis gas from the first reactor to a first condenser to remove water and produce a gas stream that includes hydrogen and carbon dioxide; supplying the gas stream that includes hydrogen and carbon dioxide from the first condenser to a vacuum pressure swing adsorption process to produce a pure carbon dioxide stream and a high hydrogen content stream; and supplying the high hydrogen content stream to a pressure swing adsorption process to produce a pure hydrogen stream and pressure swing adsorption tail gas. In further embodiments, the method further includes the step of: supplying the pure hydrogen stream to a third reactor, the third reactor includes a catalyst and is configured for the production methane from the minor amounts of carbon monoxide and carbon dioxide present in the hydrogen stream, the third reactor producing a methane product stream and a high purity hydrogen stream.

Provided in another embodiment is a method for the production of hydrogen from synthesis gases of an oxygen supplied partial oxidation process. The method includes the steps of: supplying a hydrocarbon or carbonaceous feedstock and oxygen to an oxygen supplied partial oxidation process to produce a synthesis gas, the synthesis gas includes carbon dioxide, carbon monoxide, and hydrogen; supplying the synthesis gas to a first reactor, the first reactor includes a catalyst and is configured to convert at least a portion of the carbon monoxide to carbon dioxide and produce a modified synthesis gas, the first reactor also being a medium temperature water gas shift reactor or isothermal reactor; supplying the modified synthesis gas from the first reactor to a first condenser to remove water and produce a gas stream includes hydrogen and carbon dioxide; supplying the gas stream includes hydrogen and carbon dioxide from the first condenser to a vacuum pressure swing adsorption process to produce a pure carbon dioxide stream and a high hydrogen content stream; supplying the high hydrogen content stream to an amine separator unit to produce a residual pure carbon dioxide stream and amine treated high hydrogen content stream; and supplying the amine treated high hydrogen content stream to a pressure swing adsorption process to produce a pure hydrogen stream and pressure swing adsorption tail gas. In further embodiments, the method includes the step of: supplying the pure hydrogen stream to a third reactor, the third reactor includes a catalyst and is configured for the production methane from the minor amounts of carbon monoxide and carbon dioxide present in the hydrogen stream, the third reactor producing a methane product stream and a high purity hydrogen stream. In further embodiments, the vacuum pressure swing adsorption process and/or the amine separator unit are replaced by a two stage, high pressure/low pressure flash amine system that releases carbon dioxide from amine at two different pressures with heat applied to the low pressure flash to regenerate the amine.

In another embodiment, provided is a method of production of hydrogen. The method includes the steps of: supplying a carbonaceous feedstock and oxygen to an oxygen supplied partial oxidation process to produce a first product stream containing carbon dioxide, carbon monoxide, hydrogen, and sulfur containing compounds; supplying the second product stream to a medium temperature water gas shift reactor to convert at least a portion of the carbon monoxide in the second product stream to carbon dioxide and to produce a third product stream; supplying the third product stream to a carbon dioxide removal unit to produce a carbon dioxide-rich stream and a hydrogen-rich stream; and supplying the hydrogen-rich stream to a pressure swing adsorption process to produce a highly pure hydrogen stream and a pressure swing adsorption tail gas. In further embodiments, the method includes the step of supplying the pure hydrogen stream to a third reactor, the third reactor includes a catalyst and is configured for the production methane from the minor amounts of carbon monoxide and carbon dioxide present in the hydrogen stream, the third reactor producing a methane product stream and a high purity hydrogen stream.

In another embodiment, provided is a method of production of hydrogen. The method includes the steps of: supplying a carbonaceous feedstock and oxygen to an oxygen supplied partial oxidation process to produce a first product stream containing carbon dioxide, carbon monoxide, hydrogen, and sulfur containing compounds; supplying the first product stream to a sulfur removal unit to remove a substantial portion of the sulfur containing compounds from the first product stream and produce a second product stream containing carbon dioxide, carbon monoxide, and hydrogen; supplying the second product stream to a medium temperature water gas shift reactor to convert at least a portion of the carbon monoxide in the second product stream to carbon dioxide and to produce a third product stream; supplying the third product stream to a condenser to remove water and produce a gas stream containing hydrogen and carbon dioxide; and supplying the gas stream that includes hydrogen and carbon dioxide from the first condenser to a pressure swing adsorption process to produce a highly pure hydrogen stream and a pressure swing adsorption tail gas.

In a further embodiment, provided is a method of production of hydrogen. The method includes the steps of: supplying a carbonaceous feedstock and oxygen to an oxygen supplied partial oxidation process to produce a first product stream containing carbon dioxide, carbon monoxide, hydrogen, and sulfur containing compounds; supplying the first product stream to a sulfur removal unit to remove a substantial portion of the sulfur containing compounds from the first product stream and produce a second product stream containing carbon dioxide, carbon monoxide, and hydrogen; supplying the second product stream to a medium temperature water gas shift reactor to convert at least a portion of the carbon monoxide in the second product stream to carbon dioxide and to produce a third product stream; supplying the third product stream to a carbon dioxide removal unit to produce a carbon dioxide-rich stream and a hydrogen-rich stream; and supplying the hydrogen-rich stream to a pressure swing adsorption process to produce a highly pure hydrogen stream and a pressure swing adsorption tail gas. In further embodiments, the method further includes the step of supplying the pressure swing adsorption tail gas to a membrane separator unit to produce a permeate stream containing hydrogen and a retentate recycle stream. In further embodiments, the method further includes the steps of: supplying the permeate stream containing hydrogen at a concentration at least above 90 mol % to a catalyst-containing reactor to produce a high purity hydrogen stream and a methane stream from minor amounts of carbon monoxide and carbon dioxide present in the permeate stream. In further embodiments, the carbon dioxide removal unit is an enzyme-based reactor or includes an amine-based extraction media.

Further embodiments of the methods and processes disclosed herein include extracting exothermic heat for the production of power, heating and cooling of the process, or export of steam. In other embodiments, waste gases, including tail gases, are purged from the process and are destructed in a fuel cell, thermal oxidizer, duct burner, or flare with or without pollution control catalysts and with or without waste heat recovery. In further embodiments, a sulfur removal process is employed to remove sulfur. In further embodiments, a soot removal process is employed to remove soot. In further embodiments, the first and second reactors are replaced with either one or three reactors. In further embodiments, the methods and processes described herein include supplying the high purity hydrogen stream to a Fischer Tropsch gas to liquids process, or a process for the production of ammonia, urea, ammonium nitrate, nitric acids, diesel exhaust fluids, mixed alcohols; production of aldehyde alcohols, ethanol, methanol, methyl tert-butyl ether, acetic acid, olefins, synthetic diesel, gasoline, gasoline additives, or dimethyl ether. In further embodiments, the methods and processes described herein utilize a hydrogen generator, wherein the hydrogen generator produces hydrogen and oxygen from a water feedstock, wherein the hydrogen is supplied to a fourth reactor and the oxygen is supplied to the oxygen supplied partial oxidation process. In yet further embodiments, water recovered from the first and second condensers is supplied to the hydrogen generator as feedstock.

In further embodiments, the methods and processes described herein include supplying the high purity hydrogen stream and nitrogen gas from an air separation unit to a fourth reactor, the fourth reactor includes a catalyst and is configured to produce an ammonia product stream. In further embodiments, gases exiting the air separation unit are used as media for heat exchangers for gases exiting the oxygen supplied partial oxidation process or associated processes and auxiliary load heat sinks. In further embodiments, the first and second reactors are replaced with one or three reactors. In further embodiments, an air separation unit is employed to separate nitrogen and oxygen from air, wherein the nitrogen is supplied to the fourth reactor and oxygen is supplied to the oxygen supplied partial oxidation process.

In further embodiments, the methods and processes described herein include the step of supplying the high purity hydrogen stream from the third reactor to a second condenser which is configured to remove any trace water present in the high purity hydrogen stream.

In further embodiments utilizing an amine separator unit, the amine separator unit is replaced with a two stage, high pressure/low pressure flash amine system that releases carbon dioxide from amine at two different pressures with heat applied to the low pressure flash to regenerate the amine.

In further embodiments, the third product stream is supplied to a wash system to decrease concentration of ammonia and hydrogen cyanide in the third product stream to below 5 parts per million by volume.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
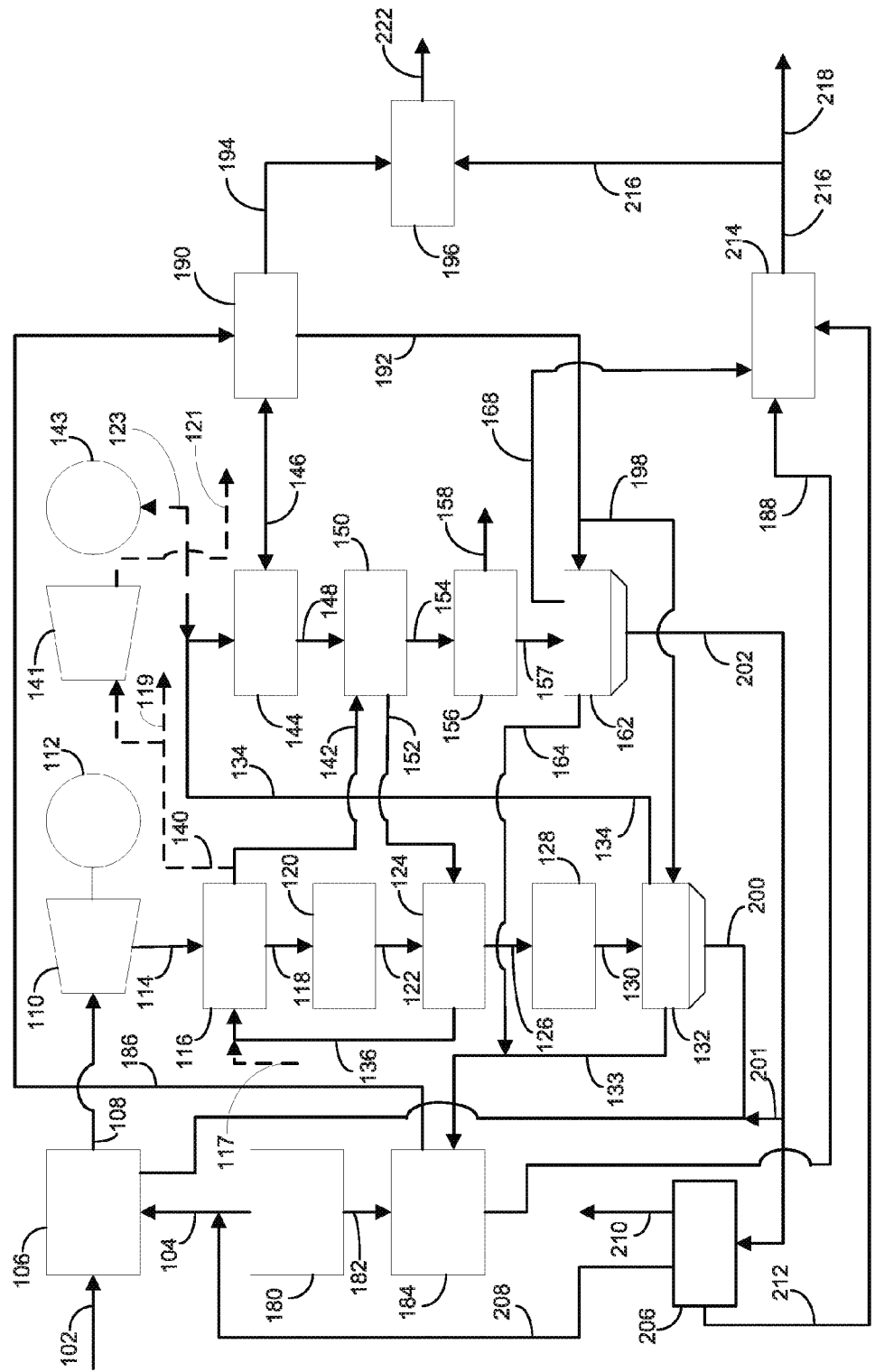
FIG. 1 shows an embodiment of a process for the production of high purity hydrogen for use in a process to produce ammonia and/or urea.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention. Although the following detailed description contains many specific details for purposes of illustration, it is understood that one of ordinary skill in the art will appreciate that many examples, variations and alterations the process and apparatus herein are within the scope and spirit of the invention. Accordingly, the exemplary embodiments of the invention described herein are set forth without any loss of generality, and without imposing limitations, on the claimed invention.

Polygeneration Process

The present disclosure provides for polygeneration processes for production of hydrogen. As used herein, "polygeneration" refers to an integrated process that has three or more outputs, which includes energy output(s), produced from one or more input resources. The partial oxidation gas turbine or partial oxidation industrial process generates a hot gaseous stream (i.e., synthesis gas) consisting of core gases of carbon monoxide, carbon dioxide, and hydrogen. These gases can then be supplied to the hydrogen production process. For example, embodiments described herein provide a polygeneration process for the combined production of urea and nitrogen based fertilizer from the by-products of an oxygen-supplied partial oxidation power generation or oxygen supplied partial oxidation industrial process. In certain further embodiments, the hydrogen gas can be supplemented with cold nitrogen, which has not been supplied to hot gas process, to produce nitrogen and ammonia-based fertilizer as byproducts of the power generation or industrial gas process.

In certain embodiments, the apparatuses and processes described herein can include polygeneration looping for the production of additional power and heat from steam generation from exothermic reaction. In certain embodiments, the process can include integration with known ammonia and fertilizer production processes to utilize the power generation byproducts and heat for the production of valuable chemical intermediates and products, such as sulfur, ammonia, nitrogen, hydrogen, noble gases, and rare earth metals. In certain embodiments, the feedstock for the process is a fossil fuel or synthesis gas. In certain embodiments, the fossil fuel or synthesis gas is treated to remove various contaminants, as described below.

In certain embodiments of the present invention, a major advantage of the invention described herein is the replacement of the steam reformation process for the conversion of methane and hydrocarbon fuels into synthesis gases and hydrogen, efficiently with low emissions, for further process uses. Provided herein is the use of an oxygen supplied partial oxidation power generation or oxygen feed industrial process. In certain embodiments, the system provides for the production of energy through oxygen supplied partial oxidation power generation and oxygen supplied partial oxidation industrial gasification of the feedstock to synthesis gas, and eliminates or significantly reduces the production of nitrous oxides prior to the production of hydrogen products, such as nitrogen and ammonia based fertilizers. Advantageously, the energy produced can then be sold to offset the cost of feedstock with net power sales. Additionally, the use of an air separation unit and potential ammonia refrigeration unit reheating advantageously allows the cold exiting gases to be used as a heat sink in various associated heat exchangers and condensers while providing nitrogen to the ammonia process and oxygen to the oxygen supplied partial oxidation process. Additionally, the use of the air separation unit and various heat exchangers provides a method to provide cooling to the power plant and associated industrial processes in environments having a reduced availability of cooling water, or in hot climates.

In some embodiments, the present disclosure provides that an oxygen supplied partial oxidation gas turbine may produce power through its direct drive turbine generator, an expansion turbine, or other driven apparatus that is downstream using its exhaust thrust to turn the apparatus and downstream heat can be recovered for beneficial use such as the production of steam; or an oxygen supplied partial oxidation industrial process may replace or be in parallel or series to the partial oxidation gas turbine and the exothermic heat of the partial oxidation process can be recovered for beneficial use such as the production of steam or power. Downstream of the partial oxidation process heat can also be used from chemical manufacturing, such as a water gas shift reaction as described herein for the production of hydrogen A variety of known oxygen supplied partial oxidation, zero-emission power generation schemes have been proposed in the past, such as the Matiant and Graz cycles, and can be advantageously used in the present invention for providing a feedstock for the preparation of the ammonia and urea compounds. For example, the schemes proposed in U.S. Pat. Nos. 5,715,673 and 5,956,937 are based on a process in which a high-pressure combustor is fired with oxygen, gaseous fuel, and water to produce a drive gas for a steam turbine. The discharge from the turbine can be reheated in an intermediate pressure combustor fired with additional fuel and oxygen. The discharge then enters a turbine to generate additional power. The discharge can be supplied to a condenser to separate water, and a carbon dioxide-rich effluent can then be vented, compressed, treated, and sold or delivered to a sequestration site.

Another method for operating a boiler using oxygen-enriched oxidants is disclosed in U.S. Pat. No. 6,314,896; which generally discloses a method for operating a boiler in which oxygen-enriched air is introduced with a fuel into the combustion space within a steam-generating boiler.

Another exemplary scheme for power generation using steam and gas turbines that can be used was proposed by Bolland and Saether (see, ENERGY CONVERSION & MANAGEMENT, Vol. 33, Nov. 5-8, 1992, p. 467). The scheme consists of supplying a combustor with oxygen from an air separation unit (also referred to as an "ASU"), reacting the oxygen with fuel, adding water or steam to control combustor outlet temperature, and passing combustor gases through a turbine to generate power. In this heat recovery system, a water inlet stream is used to cool the discharge of the air separation unit main compressor.

Yet another scheme that was proposed discloses using oxygen supplied partial oxidation combustion in conjunction with a water recycle (see, Yantovskii; PROCEEDINGS OF WORLD CLEAN ENERGY CONFERENCE, Geneva, Switzerland, 1991, pp. 571-595). A high-pressure combustor receives oxygen from an air separation unit, hydrocarbon fuel, and recycled water to produce a steam/carbon dioxide drive gas that enters a turbine. This is followed by two stages of reheating and expansion. The carbon dioxide is separated in a condenser, and the condensate is recycled to the high-pressure combustor. The cycles described are purportedly capable of attaining relatively higher efficiencies, but this is contingent upon the development of advanced steam turbines.

In a process known as the "Matiant" cycle, (see, PROCEEDINGS OF THIRD INTERNATIONAL CONFERENCE ON CARBON DIOXIDE REMOVAL (ICCDR-3), Boston, 1996), a drive gas for a gas turbine is produced by combusting with oxygen and recycled carbon dioxide. The drive gas enters a turbine operating at pressures and temperatures characteristic of gas turbines. The turbine discharge enters a heat recovery device, such as a heat recovery steam generator, is cooled, and the water is separated. A portion of the carbon dioxide-rich effluent is recycled to the combustor and the remainder is vented or compressed. Variations of this concept also incorporate techniques to liquefy, heat, and expand the carbon dioxide product, as disclosed, for example, in U.S. Pat. No. 5,802,840. Similar schemes are also described in U.S. Pat. Nos. 3,736,745; 4,434,613; 4,498,289; 5,175,995; 5,247,791; and 5,265,410.

Although these cycles purport to enable higher efficiency energy production, they are dependent on the development of increasingly high pressure, high temperature turbines which are not currently available.

An exemplary scheme for the production of power is through "Isothermal Gas Turbine Using Catalytic Partial Oxidation" in International Patent WO 91/05946, May 2, 1991 (J. S. Ribesses) and demonstrated by the Institute of High Temperature (IVTAN) in the former Soviet Union in the late 1950s. This scheme demonstrated catalytic partial oxidation reactors and combustion of the gas through partial oxidation gas turbines to generate power without contemplation of fertilizer production. Later and current work by the Gas Turbine Institute ("GTI") building on this concept has shown potential for hydrogen production and Fischer-Tropsche gas-to-liquids applications from a slip stream of the synthesis gas, but did not contemplate synthesis of ammonia based fertilizers and urea (Newby, et. al, "An Evaluation of a Partial Oxidation Concept for the Combustion of Turbine Power Systems," ASME paper 97-AA-24, 1997). The similar scheme as described in U.S. Pat. No. 8,268,896 was the resulting work of the previous concepts, but requires emissions to atmosphere of contaminant gases such as nitrous oxides, use of natural air or oxygen amended air flow for fuel oxidation, and does not provide for economic or innovative capturing and reuse of carbon dioxide. Embodiments of the present invention provide apparatus and processes that operate with an oxygen atmosphere to remove contaminant gases, have higher economic efficiency for the production of synthesis gas, use synthesis gas for ammonia production with bypassed nitrogen, and provide a means to capture and reuse carbon dioxide and nitrogen in the production of fertilizer.

In contrast to the Matiant cycle, the "Graz Cycle" (see, ASME paper 95-CTP-79, ASME COGEN-TURBO POWER CONFERENCE, Vienna, Austria (1995), and also in CIMAC paper G07, CIMAC CONFERENCE, Interlaken, Switzerland (1995)) describes a high-pressure combustor fired with fuel, oxygen, steam, and a recycled carbon dioxide steam. The stream leaving the combustor is expanded in a high-pressure turbine and enters a heat recovery system to generate pure steam, which subsequently enters a steam turbine. The discharge from the steam turbine then enters the combustor. After heat recovery, a portion of the high pressure turbine discharge is compressed and recycled back to the combustor while the remaining portion enters a low pressure turbine and a water removal system.

It is understood that according to various embodiments described herein, there will be various start-up and shut-down processes that may require out of specification venting. In such uses of the processes described herein, the gases vented may be treated with oxidation or thermal catalytic reduction prior to emitting to the atmosphere. It should also be understood that industrial process may have emergency operation scenarios. According to emergency scenarios using certain processes described herein, it is understood that certain gases may be flared for thermal destruction. It should also be understood that various processes described herein may vent gases or impurities that are not deemed air contaminants or do not have emissions limits.

Fuel Sources

The fuel that may be fed to the oxy-fired process includes methane, synthesized natural gas, methanol, synthesis gas ("COH"), or other hydrocarbon fuels and by products such as tar, pitch, bitumen, coal, petcoke, or like materials that are able to be oxidized in an oxygen-supplied partial oxidation process and that can be subjected to cleanup or contaminant removal. In some embodiments, the fuel sources include carbonaceous materials including solids, liquids, or organic wastes such as digestate from biogas production. Solid wastes from torrefaction or pyrolysis will be vitrified or char and repurposed for beneficial use. Compositions of product streams and heat can be adjusted with fuel flow, oxygen flow, and vessel residence time to make the ideal synthesis gases for entry into the first heat exchanger. The use of certain hydrocarbon fuels requires certain removal systems for contaminants contained therein.

In certain embodiments, torrefaction or pyrolysis of carbonaceous feedstocks in an oxygen environment can provide the heat and synthesis gas streams similar to a partial oxidation nozzle. In certain embodiments, when the synthesis gas stream from torrefaction or pyrolysis is not the same as synthesis gas from partial oxidation, the synthesis gas can be further partially oxidized as described herein.

Certain fuel sources may be subjected to cleanup or contaminant removal as certain fuels require removal systems for contaminants contained therein.

Desulfurization, when required, can occur prior to fuel admission into the process or can be part of the process after partial oxidation.

Contaminant Removal Systems

Various contaminant removal systems can be used in various embodiments of the present disclosure. The contaminant removal systems can be selected based on the fuel source supplied to the oxy-supplied partial oxidation process. The contaminant removal systems can be placed at various locations in the processes described herein, including both up and downstream of the oxy-fired process. Contaminants that can be removed include soot, sulfur and sulfur compounds, metals, and particulate matter.

Exemplary contaminant removal systems according to certain embodiments include sulfur removal systems, such as a sacrificial catalysts; dry limestone; wet limestone; solvent; amine solution; wet scrubbing using a slurry of alkaline absorbent, usually limestone or lime, or seawater to scrub gases; ash using a baghouse spray-dry scrubbing using similar absorbent slurries; wet sulfuric acid process; dry sorbent injection systems or electrostatic precipitator, and candle filters, high temperature fabric filters, or ceramic filters for the removal of metals or particulate matter, each of which can be added to the synthesis gas treatment stream. For example, a flue gas wet scrubber could replace the first condenser for water removal and polishing the water prior reintroduction to the combustion cycle or sale. Each of these synthesis gas treatments for systems employing other hydrocarbons can also create salable byproducts to the process. For example, acid gas removal systems for sulfur will produce elemental sulfur, which is beneficial to the treatment of fertilizer for extended release breakdown of the fertilizer. Trace amounts of nitrogen can be scrubbed in the process and converted to nitrogen or ammonia.

In further embodiments, the sulfur removal system includes a catalyst or a solvent or water wash. Additionally, in some embodiments, a sacrificial guard bed is employed to remove soot or sulfur. The sacrificial guard bed may be a stand-alone component or a component incorporated into one or more of the reactors. Exemplary contaminant removal systems can include solid particle removal systems, such as cyclones, sintered or ceramic candle filters, electrostatic precipitators or fabric filters, and metal removal systems such as inorganic filters, fabric filters, and nanomaterials.

In further embodiments, a particulate filter can be placed prior to the reactors to remove potential soot formation risk due to free carbon presence. In some embodiments, the particulate filter is a sintered metal, a ceramic, an electrostatic precipitator, or a high temperature fabric material. In further embodiments, the particulate filter is a combination of a sulfur guard bed, a water gas shift guard bed, and/or a sacrificial catalyst.

In certain embodiments, the contaminant removal system can be placed downstream of the oxygen supplied partial oxidation process. For example, a flue gas wet scrubber could replace the first condenser for water removal and polishing the water prior reintroduction to the combustion cycle or sale. Each of these synthesis gas treatments for systems employing other hydrocarbons can also create salable byproducts to the process. For example, acid gas removal systems for sulfur will produce elemental sulfur, which is beneficial to the treatment of fertilizer for extended release breakdown of the fertilizer. Trace amounts of nitrogen can be scrubbed in the process and converted to nitrogen or ammonia. In some embodiments, the contaminant removal system can be placed upstream of the oxygen supplied partial oxidation process. In further embodiments, the process includes a contaminant removal system down stream of the oxygen supplied partial oxidation process. In further embodiments, the process includes a contaminant removal system both up and down stream of the oxygen supplied partial oxidation process. In some embodiments, the hydrocarbon fuels containing sulfur may be subject to desulfurization before being treated at the first catalyst-containing reactor. The desulfurization process may include dry or wet limestone, solvent, amine solution or other desulfurization methods of the art, such as hydrodesulfurization with a reheating cycle. The contaminant removal process implemented in various embodiments will oftentimes be dictated by the fuel sources and the desired end product purities. Removal of sulfur may be critical when using sulfur sensitive catalysts in the water gas shift reactors described herein.

In embodiments with two water gas shift reactors, the sulfur removal system may be between the water gas shift reactors consisting of sacrificial catalysts or a regenerative heat hydrodesulfurization system.

Stream Purity

In some embodiments, the oxygen supplied to the oxygen supplied partial oxidation process has a purity of at least about 95 mol %, alternatively at least about 99 mol %, alternatively at least about 99.5 mol %, alternatively at least about 99.9 mol %.

In certain embodiments, the process yields highly pure product streams.

In some embodiments, the process yields a hydrogen stream with a purity of at least about 98 mol %. In some embodiments, the process yields a hydrogen stream with a purity of at least about 98.5 mol %. In some embodiments, the process yields a hydrogen stream with a purity of at least about 99.0 mol %. In some embodiments the process yields a hydrogen stream with a purity of at least about 99.5 mol %. In some embodiments, the process yields a hydrogen stream with a purity of at least about 99.9 mol %. In some embodiments, the process yields a hydrogen stream with a purity of at least about 99.99 mol %. In some embodiments, the process yields a hydrogen stream with a purity of at least about 99.999 mol %. In some embodiments, the process yields a hydrogen stream that has less than 0.5 ppm elemental oxygen. In some embodiments, the process yields a hydrogen stream that has less than 1 ppm elemental oxygen. In some embodiments, the process yields a hydrogen stream that has less than 2 ppm elemental oxygen. In some embodiments, the process yields a hydrogen stream that has less than 5 ppm elemental oxygen. In some embodiments, the process yields a hydrogen stream that has less than 10 ppm elemental oxygen. In some embodiments, the process yields a hydrogen stream that has less than 15 ppm elemental oxygen. In some embodiments, the process yields a hydrogen stream that has less than 20 ppm elemental oxygen. In some embodiments, the process yields a hydrogen stream that has less than 25 ppm elemental oxygen. In other embodiments, the process yields a hydrogen stream that is free of nitrogen. In other embodiments, the process yields a hydrogen stream that is free of argon.

In further embodiments, carbon dioxide streams produced have a purity of at least about 99 mol %, preferably at least about 99.9 mol %. In some embodiments, carbon dioxide streams produced have a purity of at least about 85 mol %. In some embodiments, carbon dioxide streams produced have a purity of at least about 90 mol %. In some embodiments, carbon dioxide streams produced have a purity of at least about 95.0 mol %. In some embodiments, carbon dioxide streams produced have a purity of at least about 96 mol %. In some embodiments, carbon dioxide streams produced have a purity of at least about 97 mol %. In some embodiments, carbon dioxide streams produced have a purity of at least about 97.5 mol %. In some embodiments, carbon dioxide streams produced have a purity of at least about 98.5 mol %. In some embodiments, carbon dioxide streams produced have a purity of at least about 99.0 mol %. In further embodiments, the carbon dioxide-rich stream additionally contains water. In further embodiments, the carbon dioxide-rich stream additionally contains argon. In further embodiments, the carbon dioxide-rich stream additionally contains nitrogen. In further embodiments, the carbon dioxide-rich stream additionally contains carbon monoxide.

In some embodiments involving the use of the hydrogen streams to produce ammonia, an ammonia is produced having a purity of at least about 99 mol %, preferably at least about 99.9 mol %.

System for Production of Hydrogen for Use in Industrial Processing

In certain embodiments described herein, a single facility may include only the production of highly pure hydrogen stream. In such embodiments, the other product streams may be fed to additional facilities for further processing.

In further embodiments, the highly pure hydrogen stream may be produced in an integrated facility for certain industrial processes, such as processes for production for ammonia and urea, urea and ammonium nitrate, nitric acids, and diesel exhaust fluids; various Fischer-Tropsch processes; production of mixed alcohols; production of aldehyde alcohols; production of ethanol; and production of methanol and subsequently ethanol, methyl tert-butyl ether, acetic acid, olefins, synthetic diesel, gasoline, gasoline additives (e.g. M100, M85), and dimethyl ether. In such embodiments, the highly pure hydrogen stream is produced at the same facility, or on the same site as the additional industrial processes.

Hydrogen to Carbon Ratios

In certain embodiments, the first product stream exiting the oxygen supplied partial oxidation process can have a ratio of hydrogen to carbon of between about 2:1 and 4:1, alternatively between about 2.5:1 and 3.5:1. In certain embodiments the ratio is between about 2.9:1 and 3.1:1, alternatively about 3:1. In certain embodiments, a 3:1 ratio of hydrogen to carbon may be desirable for further separation of element gases to make urea ($NH_2CONH_2$). Certain design and fuel parameters of the oxygen supplied partial oxidation generation or industrial process may require a balanced stoichiometric ratio in the input gas stream and therefore require supplemental hydrogen to be added to certain industrial processes, such as the ammonia making process, which is a precursor to making ammonia based fertilizer. By controlling the supplementing of certain components of the product, it is possible to achieve the desired or necessary ratio of gases. Feedstock for the production of hydrogen can include recycled process water, condensate water from the ammonia and fertilizer production process, connate water, fresh water, saltwater, brine, desalinated water, deionized water, or deionized brine.

Amine Separation

Exemplary integrated gasification combined cycle ("IGCC") oxygen-fired processes which rely on amine separation of carbon dioxide and mechanical or solvent separation of other feedstock components to provide a nitrogen-free gas stream include those provided by the following vendors: AlterNRG, Shell, GE/Texaco, British Gas/Lurgi, Destec Energy, ABB, Hitachi, VEW Steinmueller, Mitsubishi Heavy Industries (MHI), Prenflo/Uhde/Deutsche-Babcock, and Noell/GSP. These exemplary IGCC systems use heat assisted direct gasification of solids to synthesis gas followed by amine solvent and mechanical separation of nitrogen and sulfur oxides and power generation in a separated steam system and secondary combustion of synthesis gas through a gas turbine. This IGCC technology cannot achieve greater than 90 mol % carbon dioxide removal efficiency without mechanically choking the gas turbine. Embodiments of the present invention provided do not re-combust the first product stream after the oxygen supplied partial oxidation process and pass all carbon dioxide through the process. In certain embodiments, operation of a solid fuel gasification unit in stoichiometric or substoichiometric conditions may provide the product stream necessary for the ammonia process, but excess energy for heat and steam production may be required for the gasification reaction vessel and the efficiency advantage of embodiments described herein would not be realized with additional product stream treatment systems. Exemplary oxygen supplied partial oxidation turbines for use herein include, but are not limited to: Pratt & Whitney Rocketdyne; Siemens SGT-900 (formerly Westinghouse W251); Clean Energy Systems J79; GasPlas AS; and those described in U.S. Pat. Nos. 5,715,673 and 5,956,937.

In certain embodiments, the amine process may be divided into multiple pressure stages wherein the acid gases consisting mostly of carbon dioxide, is captured (adsorbed into solution) in the amine solvent at high pressure, and cascading lower pressure conditions in following vessels will release the acid gases to a discharge collection system or vent. Cascading pressure to a lower pressure condition will release the most gas and then allow the solvent to be regenerated with lower heat consumption. Release carbon dioxide can be collected as salable product, reused in industrial process, or released to atmosphere In certain embodiments, the heat leaving the water gas shift in the process gas stream of high hydrogen and carbon dioxide content will satisfy the heat demand to regenerate the amine solvent within a low pressure flash tank.

Exothermic Processes

In certain embodiments, the oxygen supplied partial oxidation process is an exothermic process carried out without the use of catalysts. In other embodiments, the oxygen supplied partial oxidation process is carried out in a catalytic or non-catalytic partial oxidation reactor which provides rich fuel, and lean oxygen, under a substoichiometric reaction. Heat generated herein can drive a partial oxidation gas turbine generator or expansion turbine generator, which then supplies the product stream into the first heat exchanger. Alternatively, the partial oxidation gas turbine can be replaced with a partial oxidation reactor and waste heat boiler, without the expansion turbine and more power can be generated by the steam turbine. Both partial oxidation systems produce heat between 1200° C. and 1500° C., preferably at least 1400° C. from its exothermic reaction. This product stream consists dominantly of carbon monoxide, carbon dioxide, hydrogen, water, and inert gases.

Production of Hydrogen

According to an embodiment, provided is a method for production of pure hydrogen. As shown in FIG. 1, according to such an embodiment, the first product stream exits power turbine 110 at high temperature, typically at a temperature that is greater than about 475° C., alternatively between about 360° C. and 500° C., alternatively about 495° C., via line 114, and include a mixture of carbon monoxide, hydrogen, carbon dioxide, oxygen, water (for example, as steam), and inert gases. Although the water gas shift reactor can operate at lower temperatures during lower capacity, this is the desired operating condition at normal operations. In certain embodiments, the first output stream includes between about 35 and 65 mol. % hydrogen, between about 0.5-25 mol. % carbon dioxide, and between about 10 and 25 mol. % carbon monoxide. In an alternate embodiment, the gas mixture can include between about 35 and 40 mol. % hydrogen, between about 1 and 3 mol. % carbon dioxide, and between about 17 and 23 mol. % carbon monoxide. The exact ratio of the first product stream depends on the exact composition of the hydrocarbon fuel source (i.e., methane, syngas, or other hydrocarbon source), amount of water injected via line 117 for desuperheating, and upon the stoichiometric balance of oxygen and fuel supplied to the partial oxidation process 106.

Conversion of carbon to mostly carbon monoxide and carbon dioxide and hydrogen to water is possible in a stoichiometric balance or an excess oxygen environment at line 108. To meet the requirement for steam to carbon ratio required for the water gas shift process per specific catalyst selected, steam or water near steam conditions is added via line 117 or 136. In certain embodiments, a 3:1 ratio of hydrogen to carbon will be achieved at line 108. When the ratio of hydrogen to carbon is less than 3:1, as evidenced by a lack of free hydrogen at line 108, and as also seen by the amount of hydrogen produced at line 168, in certain embodiments, additional hydrogen can be supplied by hydrogen generator 206 via line 212 to the ammonia production process in fourth reactor 214 and additional oxygen can be supplied to partial oxidation process 106 via lines 104 and 208. In certain embodiments, the partial oxidation process product synthesis gas can have a ratio of hydrogen to carbon of between about 2:1 and 4:1, alternatively between about 2.5:1 and 3.5:1. In certain embodiments the ratio is between about 2.9:1 and 3.1:1, alternatively about 3:1. In certain embodiments, the process does not limit the ratio of hydrogen to carbon within these limits, but they are preferred for optimized production and efficiency. Not all embodiments will require the hydrogen generator as a source of hydrogen; the source of hydrogen can come from other industrial sources when the hydrogen supply is not adequate for a 3:1 ratio. The addition of hydrogen from a hydrogen generator can provide additional hydrogen, as needed to produce the desired hydrogen to carbon ratio entering the process cycle for production of hydrogen. In certain embodiments, the fuel flow can control the production of carbon-oxides entering the system in stoichiometric balance or un-balance with oxygen entering the process. In certain embodiments, a fuel-rich, oxygen-lean process may result in uncombined carbon being formed. Uncombined carbon can foul the system as carbon black or coke, therefore oxygen and fuel ratio needs to be controlled to prevent or minimize uncombined carbon. The partial oxidation process can be modified to optimize the ratio of components in the first product stream for highest efficiency and desired synthesis gas ratios. Oxidized hydrogen from the synthesis gas will produce water, which can be supplied from the condenser to the hydrogen generator for production of hydrogen, injected into the fourth reactor via line 212, returning the chemical balance back to a ratio to support the production of ammonia.

The first product stream in line 114 can optionally be supplied to first heat exchanger 116 to control the temperature of the gases for further processes. When the fuel source is synthesis gas supplied, for example, by an integrated gasification cycle, carbon dioxide produced as a byproduct of the integrated gasification combined cycle process can be injected into line 194, if the carbon dioxide is pure, or into line 114 if the carbon dioxide is not pure and further treatment is needed for carbon monoxide and carbon dioxide clean-up. First heat exchanger 116 can be of any type known in the art, such as a steam generator. The size of first heat exchanger 116 can be selected based upon the cooling required to reduce the temperature of the first product stream in line 114. The first product stream exiting first heat exchanger 116 supplied via line 118 to first reactor 120, which can include a water-gas shift reaction catalyst. In certain embodiments, the first reactor 120 and/or second reactor 128 can be a replaced with either one, two, or three reactors capable of performing a water gas shift reaction to convert carbon monoxide to hydrogen across a catalyst with a net exothermic reaction. Heat of the reaction must be removed through external heat exchangers, or integrated heat exchangers or sets of integrated or external heat exchangers (not shown). The first product stream exits first heat exchanger via line 118 at a temperature selected based upon the first reactor catalyst requirements. For example, in certain embodiments, the first heat exchanger can be configured to reduce the temperature of the first product stream in line 114 to less than about 400° C., alternatively less than about 375° C., alternatively between about 355° C. and 365° C. In certain embodiments, the first heat exchanger can be configured to reduce the temperature of the first product stream in line 114 to less than about 300° C., alternatively less than about 275° C., alternatively between about 255° C. and 265° C., or alternatively greater than 200° C.

For example, in one embodiment of the Haber-Bosch process, the catalyst in the first reactor can include Cr/Fe$_3$O$_4$, requiring an inlet temperature of the synthesis gas of about 360° C. It is understood that one of skill in the art may select alternate catalysts for the various reactors described herein, which may require a different input temperature. In embodiments employing the Haber-Bosch process, the catalyst present in first reactor 120 converts carbon monoxide to carbon dioxide via a water gas shift reaction: CO+H$_2$O⇌CO$_2$+H$_2$.

The second product stream exiting first reactor 120 can be removed via line 122 and supplied to second heat exchanger 124. The second product stream includes carbon monoxide, water, carbon dioxide and hydrogen gases. In certain embodiments, second heat exchanger 124 can reduce the temperature of the gases to less than about 250° C., alternatively less than about 225° C., alternatively to between about 205° C. and 215° C., or alternatively greater than 150° C., or alternatively greater than 100° C., depending upon the specifications of the catalyst in second reactor 128.

Steam or hot water supplied via line 136 from second heat exchanger 124 can be heated in first heat exchanger 116 while reducing the temperature of turbine exit gas via line 114. Make up steam or water can be provided to the process via line 117, supplied from a demineralized water source or as steam from a cogeneration, heat recovery, or outside steam source when tied to other polygeneration systems. Steam discharged via line 142 from first heat exchanger 116 can be supplied to third heat exchanger 150, which is then supplied via line 152 to second heat exchanger 124 to cool gases entering second reactor 128. In some embodiments, steam discharged via line 142 or steam outlet 121 can be used for solvent regeneration of the acid gas removal process 144 (carbon dioxide removal). Excess steam from first heat exchanger 116 can be supplied via line 140 and used to drive an steam turbine 141 and/or a compressor 143. Alternately, excess steam removed via line 140 can be removed from the system to provide heating for an associated process via line 119.

Steam turbine 141 can be coupled to compressor 143, which can be utilized for required gas compression loads. In certain embodiments, a motor-generator can be attached to the same compressor shaft and operate as a motor for start-ups and shutdowns. Steam supplied via line 140 can be used to convert the motor to a generator as supply pressure overcomes the load of the compressor, unloading the motor, and eventually supplying enough torque to run both the compressor and motor as a compressor and generator. In certain embodiments, motor-generator can include slip rings and brushes or a permanent magnet generator for the field magnetism. In certain larger installations, multiple turbine units and motors can be used to meet redundancy requirements. Once redundancy requirements are met for start-up and shutdown reliability, a turbine-generator or turbine-compressor may be added to provide power generation or gas compression with excess steam. As is understood by one of skill in the art, not all turbine shafts will include motor-generator drives. The motor-generator drive advantageously facilitates the start-up and shutdown processes, and can reduce both the cost of the equipment and the number of shafts needed per piece of equipment. In certain embodiments, saturated steam can be removed from steam turbine 141 and supplied to a condenser, extraction steam system, or to an associated process. Carbon dioxide can be supplied from first condenser 132 via line 134 for compression by compressor 143 via line 123, and supplied to the carbon dioxide removal process 144 via a parallel line 123. A load control valve between lines 134 and 123 will select the load of the compressor if needed and cycle the compressor into service mode, modulate mode, and out of service (unloaded). Some embodiments may not have need for the compressor if backpressure turbines and condensers are used for power turbine 110 and first condenser 132, and if the pressure is adequate to provide flow into carbon dioxide removal process 144 via line 134 directly. Optionally, steam can also be released via steam outlet 121.

The second product stream exiting first reactor 120 via line 122 are supplied to second heat exchanger 124 to control the temperature of the gases, and then supplied via line 126 to second reactor 128. In certain embodiments, the second reactor 128 can include a catalyst operable to scavenge carbon monoxide in the water gas shift. In embodiments employing the Haber-Bosch process, the catalyst in second reactor 128 can include Cu/ZnO/Cr and can be supplied to the reactor at a temperature of about 210° C. The Haber-Bosch process converts remaining carbon monoxide in the gas to carbon dioxide in a water gas shift reaction, CO+H$_2$O⇌CO$_2$+H$_2$.

The third product stream produced in second reactor 128 exits via line 130 and can be supplied to first condenser 132. Generally, the third product stream will be saturated with water vapor. The water vapor in first condenser 132 is cooled by chilled water supplied via line 198, which itself can be cooled by various means, such as with gases (e.g., nitrogen) provided by air separation unit 180 or the chilled ammonia from the ammonia refrigeration plant. In certain embodiments, the nitrogen gas from air separation unit 180 can be supplied to nitrogen gas heat exchanger 184 via line 182, having a temperature of between about 4-21° C., or in some embodiments 10-40° C., as necessary to facilitate the condensation of water from the produced gases. Condensate water removed from first condenser 132 via line 200 can be supplied to oxygen supplied partial oxidation process 106, to the hydrogen generator 206, to the heat exchangers, to excess water sales, or to an associated process for urea production, such as granulation or prilling. Water from first condenser 132 can also be fed via line 133 to the nitrogen gas heat exchanger 184. In some embodiments, nitrogen cannot supply the cooling necessary for chill water and nitrogen gas heat exchanger 184 is replaced with a cooling tower or other heat exchanger.

The fourth product stream exiting first condenser 132 via line 134 through air separation baffles will primarily include a ratio of hydrogen and carbon, possibly also including small or trace amounts of carbon monoxide and inert gases. In certain embodiments, the fourth product stream includes about 65-75 mol % hydrogen, 20-30 mol % carbon dioxide, 0.5-5 mol % carbon monoxide, and trace inert gases. The fourth product stream supplied via line 134 is supplied to acid gas/carbon dioxide removal process 144. In certain embodiments, a vacuum pump or compressor 143 is placed in carbon dioxide removal line 134 to extract gases from the condenser baffles and discharge to the carbon dioxide removal process 144 if there is a vacuum in the first condenser 132 due to the collapse of the volume of steam to water. When backpressure type turbines are used to match the turbine design parameters or a partial oxidation industrial process is used in place of the partial oxidation gas turbine 110, the carbon dioxide rich gas flow may not require the compressor to transfer gas from the condenser to the next stage of carbon dioxide removal process due to maintained positive pressure in the condenser. Carbon dioxide removal process 144 removes carbon dioxide using an extraction media or solvent supplied, such as an amine based solutions, such as MDEA (methyldiethanolamine), MEA (monoethanolamine), Ucarsol™, DGA (diglycolamine) and the like. In certain embodiments, carbon dioxide removal process 144 can employ the Rectisol™ removal process. In certain embodiments, mechanical separation, water wash, or pressure/temperature swing adsorption may be used to separate the hydrogen and carbon dioxide streams at carbon dioxide removal process 144. The carbon dioxide is then recovered in carbon dioxide recovery unit 190, which separates the amine based extraction media from the carbon dioxide. The carbon dioxide-lean amine based extraction media can then be recycled via line 146 to carbon dioxide removal process 144, which can cycle the extraction media in a rich and lean process loop. The amine can be condensed with chilled water from the chill water system flow supplied via line 186, which exits from carbon dioxide recovery unit 190 via line 192. A high purity carbon dioxide stream can then be supplied to fifth reactor 196 via line 194, or alternatively can be recovered or supplied to an alternate associated process (not shown in FIG. 1). Water exiting from carbon dioxide recovery unit 190 can fed directly to second condenser 162 via line 192 or split to be also fed to first condenser 132 via line 198.

The fifth product stream exiting the carbon dioxide removal process 144 includes hydrogen gas having a purity of greater than 90-95 mol %, preferably at least about 93 mol %, and uncaptured carbon dioxide and carbon monoxide. This stream is supplied to third heat exchanger 150 via line 148. The gases can be heated to a desired temperature and supplied via line 154 to third reactor 156. The third reactor includes a catalyst suitable for the production of methane (i.e., methanation). The temperature to which the gases are heated or cooled is selected based upon the catalyst specification for the catalyst present in third reactor 156. In some embodiments, the third reactor (methanator) can be preceded or replaced by a pressure swing adsorber (not shown in FIG. 1) that can improve quality of the product stream to a hydrogen purity of greater than 95 mol %, preferably at least 99 mol %. A tail gas recycle stream from the pressure swing adsorber can be recycled to the water gas shift to convert trace amounts of carbon monoxide; sent to vent to remove inert gases where permitted by law; or sent to a thermal oxidizing process for destruction and vent to atmosphere with or without heat recovery (not shown in FIG. 1). A portion of the tail gas recycle stream can be vented to purge inert gas build-up through the vent to atmosphere where permitted by law, or sent to a thermal oxidizing process for destruction, and vent to atmosphere with or without heat recovery.

In some embodiments, the carbon dioxide removal process 144, third heat exchanger 150, third reactor (methanator) 156 and condenser 162 can all be replaced with a pressure swing adsorber (not shown in FIG. 1.) that will remove contaminant gases from the hydrogen product stream with the tail gas recycled from the adsorber to the water gas shift reactor(s) or sent to waste fuel, and can have a purge stream to remove inert gas build-up through vent to atmosphere where permitted by law, or sent to a thermal oxidizing process for destruction and vent to atmosphere with or without heat recovery (not shown in FIG. 1.). In some embodiments, the process stream exiting the adsorber can have a hydrogen gas purity of greater than 97 mol %, preferably at least 99 mol % and can exit the adsorber prior to third heat exchanger 150 and third reactor 156 for further purification (i.e. methanation).

This third reactor 156 converts the remaining trace amounts of carbon dioxide and carbon monoxide, along with hydrogen, into methane and water vapor. The third reactor 156 can include a catalyst suitable for the conversion of carbon monoxide to methane, including those that contain transition metals including Ni, Fe, Co, Ru, Mo, etc. dispersed on metal oxide supports such as $Al_2O_3$, $SiO_2$, $TiO_2$, $ZrO_2$, $CeO_2$, etc., and a range of other oxidic and pre-reduced catalysts. In an embodiment employing the Haber-Bosch process, the catalyst can include $Ni/Al_2O_3$ and the gas inlet temperature can be about 325° C. The conversion generally takes place in two primary reactions, $CO+3H_2 \rightarrow CH_4+H_2O$ and $CO_2+4H_2 \rightarrow CH_4+2H_2O$. Methane and water produced by the reactions can be removed via line 158 for further separation (for example, by pressure swing adsorption, condensation, membrane technologies, and the like), and returned to the inlet of the oxygen supplied partial oxidation process 106 as fuel gas.

A highly pure hydrogen stream, having a purity as described above, exits the third reactor 156 via line 157 with any excess water, is supplied to second condenser 162. Water is condensed and removed via line 202, and the highly pure hydrogen can then be supplied to other industrial processes.

Production of Ammonia and Urea

The highly pure hydrogen stream can be supplied to certain industrial processes. For example, as shown in FIG. 1, the highly pure hydrogen stream is supplied to a process for making ammonia and urea. In such embodiments, the highly pure hydrogen stream is supplied via line 168 to fourth reactor 214 for the production of ammonia. Water is condensed from the gas stream supplied via line 157 through condensation with chilled water via line 192. The hydrogen gas can exit through gas separation baffles to the ammonia process via line 168. Condensate water can be supplied from line 202 to hydrogen generator 206, or combined via line 201 with water from first condenser 132 to be supplied to the oxygen supplied partial oxidation process 106. Water from second condenser 162 can also be fed via line 164 to the nitrogen gas heat exchanger 184 or suitable heat sink. In certain embodiments, excess water can be removed from lines 200, 201, and/or 202 (not shown), as needed. Similarly, make-up water can be added to the system via lines 200, 201, and/or 202 (not shown), as needed.

Fourth reactor 214 is supplied with hydrogen gas from the second condenser 162 via line 168 and from the hydrogen generator 206 via line 212, if supplemental hydrogen is needed. Fourth reactor 214 is supplied with nitrogen gas exiting the nitrogen gas heat exchanger 184 via line 188, or directly from the air separation unit 180, or other outside pure nitrogen supply. Fourth reactor 214 includes a catalyst suitable for the production ammonia. In certain embodiments, the catalyst is an iron based catalyst, which can be promoted with potassium, calcium, and aluminum ($K_2O$, CaO and $Al_2O_3$). In certain embodiments, the catalyst may be a carbon fiber based matrix with a plating of palladium, ruthenium, nickel, rhodium, or combinations thereof. In certain embodiments, hydrogen and nitrogen are supplied to the reactor and passed over the catalyst to produce ammonia via the following reaction: $N_2+3H_2 \leftrightharpoons 2NH_3$. In certain embodiments, make-up hydrogen gas can be supplied to line 168 by other means (not shown), or when excess hydrogen is present, removed for sale or supply to an associated process (not shown). In certain embodiments, excess nitrogen can be vented or provided to an alternate process (not shown), or in certain embodiments, additional nitrogen can be added to the system (not shown) as needed. Ammonia from fourth reactor 214 is supplied via line 216 to fifth reactor 196 for the preparation of urea, or extracted for collection or supply to an associated process via line 218. In certain embodiments, nitrogen and hydrogen will require compression, separately or together, to achieve the design operating pressure of the fourth reactor 214

Fifth reactor 196 combines ammonia having a purity of at least about 99 mol %, preferably at least about 99.9 mol %, supplied via line 216 is combined with carbon dioxide having a purity of at least about 90 mol %, preferably at least about 99.9 mol %, supplied via line 194 to produce urea by the following reaction: $2NH_3 + CO_2 \leftrightarrows NH_2COONH_4 \leftrightarrows NH_2CONH_2 + H_2O$. In the reaction for the production of urea, for each mole of urea that is formed, one mole of water is also produced. This water produced as a by-product of the urea synthesis, can be removed (not shown) and sold or supplied to an associated process. Urea product can be sent via line 222 for collection or further processing, for example prilling and granulation.

Urea product is concentrated in three different methods in the art, by vacuum concentration, crystallization, or atmospheric evaporation. To prill, a concentrated urea solution called "melt" is admitted to an evaporator to reduce moisture content. The resulting molten urea is pumped to spray nozzles of a tower and passed counter flow to air current. Prill is formed as urea droplets combine and fall through the tower and cool. Two primary processes are currently used in the art utilizing fluidized bed and non-fluidized bed prill towers. For granulation, molten urea is sprayed into a drum or pan having seed granules sieved from the output of the process. The rotation of the drum or agitation of the pan allows for product layering and coating, and for the combination with other products, such as clay, phosphates, or sulfur. The byproduct of both granulation and prilling is sieved for size and the small product is recycled to in the process. Granules of proper size are collected for storage and byproduct delivery.

Water Gas Shift Alternatives

In another aspect, a method for the production of hydrogen from the exiting gas stream of an oxygen supplied partial oxidation process is provided wherein the second reactor referenced above is not utilized and instead, the synthesis gas stream is supplied directly to heat recovery heat exchanger(s) or integrated heat recovery boiler and then to the first condenser. In such an embodiment, a hydrocarbon fuel source, such as methane, supplied via line 102 and oxygen supplied via line 104 are combined in the partial oxidation process 106 to produce a synthesis gas. The synthesis gas can be supplied via line 108 to power turbine 110, which removes a portion of the heat and produces energy with power generator 112 connected thereto. Other fuel sources can be used, as described above. Other hydrocarbon fuels heat transfer mechanisms may include a boiler (heat exchanger) with a secondary steam cycle or high contaminant turbine to transfer the energy of the synthesis gas and pass the gas via line 114 to the first heat exchanger 116. In further embodiments, contaminant removal systems are employed, as described above.

In one embodiment, three water gas shift reactors may be used instead of one or two shift reactors. Each reactor would operate at cascading temperature to the previous reactor and improve purity of the previous reactor's synthesis gas hydrogen content. Exothermic heat of reaction would be removed via heat exchanger between or within the reactors and supplied beneficial use as described in the disclosure.

Partial Oxidation Industrial Process for Hydrogen Production

In another aspect, a method for the production of hydrogen from the exiting synthesis gas stream of an oxygen supplied partial oxidation process is provided wherein the partial oxidation gas turbine referenced above is not utilized and instead, the synthesis gas stream is supplied directly to waste heat recovery boiler, with gas purification described above, optional heat exchangers, one to three water gas shift reactor(s) depending on mode and catalyst selected common to the art, and heat exchanger(s) and then to the first condenser. In such an embodiment, a hydrocarbon fuel source, such as methane, supplied via line 102 and oxygen supplied via line 104 are combined in the partial oxidation process 106 to produce a synthesis gas. The synthesis gas can be supplied via line 108 bypassing power turbine 110 to line 114 to first heat exchanger 116, which removes a portion of the heat and produces energy with steam turbine 141 and compressor 143 connected thereto. Other fuel sources can be used, as described above. In further embodiments, contaminant removal systems are employed, as described above.

Synthesis gas exits the partial oxidation process at 1200 to 1500° C., preferably at least 1400° C., entering the first heat exchanger 116 to make steam for the steam turbine 141 via line 140. Synthesis gas temperature will be reduced by heat exchangers to control an inlet temperature to the inlet conditions of the water gas shift reactor(s) per selected catalyst common to the art, between 200° C. and 400°, preferably 210° C. to 360° C. Although the water gas shift reactor can operate at lower temperatures during lower capacity, this is the desired operating condition at normal operations. In certain embodiments, the synthesis gas mixture can include between about 40 and 65 mol. % hydrogen, about 1 to 5 mol. % carbon dioxide, and between about 15 and 30 mol. % carbon monoxide. In an alternate embodiment, the gas mixture can include between about 45 and 55 mol. % hydrogen, between about 2 and 3.2 mol. % carbon dioxide, and between about 25 and 32 mol. % carbon monoxide. The exact ratio of the synthesis gas depends on the exact composition of the fuel source (i.e., methane, syngas, or other hydrocarbon source) and upon the stoichiometric balance of oxygen and fuel supplied to the oxygen supplied partial oxidation process.

Further production of hydrogen continues as described herein, for example, see above. Similarly, the pure hydrogen stream can then be supplied to a process for production of ammonia and/or urea, as described herein, for example, see above.

Additional Description of Certain Embodiments

In certain embodiments, the product stream exiting the water gas shift provides a concentrated stream of carbon dioxide and water vapor which may be condensed for removal. The carbon dioxide may be further supplied for reaction with ammonia for urea formation and/or used for other industrial purposes. In this embodiment, steam from the oxygen fired boiler can provide required heat for a hydrogen generator and water condensed from the product streams can provide the supplemental water for hydrogen production. Oxygen can be supplied from the air separation unit and nitrogen can bypass the partial oxidation process and be injected into the ammonia process with hydrogen. This embodiment can shorten the Haber-Bosch ammonia process to one or two stages depending on carbon dioxide purity, instead of four catalyst stages.

In certain embodiments, an oxygen supplied partial oxidation boiler may be operated in a fuel rich condition. For example, when operated with methane based fuels, the oxygen supplied partial oxidation process produces a synthesis gas mixture of carbon dioxide, carbon monoxide, and hydrogen. This synthesis gas mixture can be directly supplied to the first heat exchanger 116 and then to the modified Haber Bosch ammonia process. Other hydrocarbon fuels containing sulfur may be subject to desulfurization before being treated at the first catalyst-containing reactor. The desulfurization process may include dry or wet limestone, solvent, catalytic removal, or other desulfurization methods of the art. Certain methods of desulfurization will promote condensate removal prior to the gas shift of carbon monoxide to carbon dioxide in the modified Haber Bosch process and may require temperature correction at the first heat exchanger 116 to promote the water gas shift reaction in catalyst-containing first reactor 120.

In certain embodiments, the apparatus and process described herein can reduce the synthesis gas treatment of nitrous-oxides by employing an air separation unit, which prevents nitrogen from being supplied to the oxygen supplied partial oxidation process, except for trace amounts in fuel or oxygen impurity. Nitrogen in the feedstock can be removed by known means, such as catalytic reduction, conversion to ammonia, acid removal from condensate, or other known denitrogenation processes. The oxygen supplied to the partial oxidation process can have a purity of at least about 95 mol %, alternatively at least about 99 mol %, alternatively at least about 99.5 mol %, alternatively at least about 99.9 mol %.

In certain embodiments, the apparatus and process described herein can provide steam for steam turbine compression, desalination, combined heating and power generation, absorption chilling, and/or industrial and generation loads.

In certain embodiments, the process can include the use of an air separation cold box for the cooling of the heat sinks. In certain embodiments, the apparatus and process described herein can provide a air separation unit cold box gas or ammonia refrigeration unit cold ammonia as a cooling sink to achieve one or more of the following: reduce water consumption (as compared with evaporative cooling); reduce power losses due to air cooling in the cooling cycle, increase system stability with a constant, controllable heat sink, and improve cycle efficiency through minimum condensate depression and controlled condenser backpressure; or as an off-site heat sink for connected polygeneration systems. The cooling can be provided by gases, such as nitrogen or oxygen that can chill media passing through the heat exchanger. Subsequently, the chilled media can be recycled in a closed or open loop cycle to remove heat from heat sinks within the process, such as condensers, and the bearing oil coolers of the turbines and pumps. The flowrate of the media can be controlled through other heat exchangers to reduce process temperatures, such as to produce condensate water or to adjust the temperature of one or more streams being supplied to a reactor. The media in the chill system loop can be liquid or gaseous, as known in the art. In certain embodiments, it is possible to use the gas flow exiting from the cold box portion of the air separation unit as the chilling media described herein, rather than using intermediary fluid(s).

The latent heat of condensation provided by gases from the air separation cold box reduces water consumption requirements for evaporative cooling for heat loads such as steam turbines and heat exchangers. The elimination of air cooled condensors and cooling towers allows for production of power as described herein in areas having low water resource and high ambient temperatures.

In certain embodiments, the apparatus and process described herein creates an ultra-low emissions thermal power plant. In certain embodiments, the apparatus and process described herein creates an near-zero or virtually-zero emissions thermal power plant. In certain embodiments, other than start-up and shutdown venting, maintenance, equipment failure or trips, the process described herein provides virtually no emissions from the thermal power plant. In certain embodiments, during continuous operation the processes described herein provide substantially negligible emissions in the generation of feedstock for power production and fertilizer. Put differently, in certain embodiments, during continuous operation the processes described herein provide ultra low emissions in the generation of feedstock for power production and fertilizer.

In certain embodiments, the apparatus and process described herein reduces and repurposes industrial and greenhouse gases produced as a product of power generation into nitrogen containing chemical compounds, such as fertilizer.

In certain embodiments, the apparatus and process described herein can be utilized for the production of various forms of fertilizer that incorporate ammonia and nitrogen. In certain embodiments, the apparatus and process described herein are configured for urea production rather than ammonium-nitrate, thereby reducing the incidence of leaching of nitrates when applied as a fertilizer. In certain embodiments, the process includes a step wherein the prill is coated with sulfur, thereby providing a product having an increased disintegration time for the urea, and minimized nitrate leaching. In certain embodiments, sulfur is removed from the feedstock and incorporated for sulfur treatment of the urea byproduct. In certain embodiments sulfur is provided for sulfur treatment of the urea byproduct.

In certain embodiments, the steam and condensate produced in the associated processes, such as urea synthesis or feedstock industrial gasification to synthesis gas, can be used to provide heating or cooling, or can be used for purposes of providing pressurization. Steam production in excess of the steam generated from the feedstock to meet the process demands for the processing of product streams can be directed to auxiliary loads and used to generate additional power and either sold for a net increase of power sales, or can be supplied to power an associated process. Net steam produced by the auxiliary loads can be recycled in the steam loop or returned to the source of the steam. In certain embodiments, the use of cogeneration processes, such as the inclusion of solar thermal, geothermal, biomass, cogeneration combined cycle, or waste heat can be integrated with the steam flow, as in the art. Through the use of heat exchangers and recycle streams, low temperature steam or water (i.e., having a temperature of between about 40 and 300° C.), or saturated steam can be heated and/or pressurized to beneficial levels, including superheating, through waste heat generated by other associated processes. Higher temperatures can be directed to the gasification process for the creation of steam, or be sent through the steam turbine for power production, whereas medium and lower temperatures can generate heating or cooling effects in the thermodynamic cycle. High pressure and high temperature steams that are produced as a result of the processes described herein, such as urea production, can be added to the steam system for beneficial use such as the steam turbine, and the low temperature and low pressure water and steam can be returned through the steam or cooling systems. In certain embodiments, chilled loads can be serviced through process looping between the power or industrial plant, ammonia processing, fertilizer processing, and/or granulation or prilling processes.

The sale of excess power produced, or internal use of excess power that is produced, will offset the power cost normally attributed to fertilizer production process and effectively reduce the cost of feedstock and fertilizer production costs. By comparison, when steam reformation is used to produce the feedstock for ammonia based fertilizers, the feedstock of natural gas typically makes up about 70-90% of the total cost to produce the fertilizers, of which 25-40% is used to generate indirect heat for the reformation process and produces associated emissions from its combustion, whereas embodiments of the present disclosure do not use an indirect heating method and does not have associated emissions.

In certain embodiments, air is supplied to the air separation unit and nitrogen is separated prior to the oxidation process, such that pure or nearly pure oxygen is supplied to the oxidation step. As noted previously, the oxygen supplied to the oxygen supplied partial oxidation power generation or oxygen feed industrial process can have a purity of greater than 95 mol %, alternatively greater than about 97 mol %, alternatively greater than about 98 mol %, alternatively greater than about 99 mol %. In certain preferred embodiments, the oxygen can have a purity of greater than about 99.99 mol %. By removing nitrogen from the oxygen prior to oxidation process, the amount of energy and scale of process equipment required to provide nitrogen in ammonia production is reduced when compared to steam reformation.

Hydrogen production if supplied from supplemental hydrogen can also reduce the amount of oxygen required from the oxygen generator, thereby making the oxygen generator smaller and therefore a smaller electrical load and capital cost.

Known processes or portions of known processes for the production of ammonia, such as the Haber-Bosch process, and known processes for the production of urea, such as the Stami or Uhde process, are exemplary processes that can be utilized in the present invention, using the product streams from the oxygen supplied partial oxidation power generation or oxygen supplied partial oxidation industrial gasification process to make nitrogen and ammonia based fertilizers. A variety of ammonia and fertilizer production processes could be advantageously utilized, thereby allowing for the use of a variable synthesis gas ratios to produce ammonium based products, such as urea, ammonium nitrate, ammonium sulfate, and ammonium phosphate. These known Haber Bosch processes can be optimized resulting from the removal of nitrogen from the gas processing path.

Known processes or portions of known processes for the production of synthetic fuels, such as the Fischer Tropsch process to manufacture methanol or synthetic diesel or gasoline are exemplary processes that can be utilized in the present invention.

In certain embodiments, the catalyst specifications will dictate adjustment of temperature, pressure, and gas ratio to meet the ideal conditions for the Haber-Bosch or Fischer-Tropsch processes. For example, the process parameters will be different for the iron based catalyst, as compared with ruthenium, cobalt, and palladium catalysts Steam generators for heat recovery can be utilized and can provide the temperature and pressure balancing for the process gases, with the synthesis gas flowrate being selected based upon the power or steam demands. The amount of feedstock, oxygen, and water supplied to the reaction zone prior to entering the catalysts and oxygen content will control the stoichiometric balance. Water, gas, and steam injection can also be used to control gas and density balances with controlled feedback loops. Process looping can provide mechanisms to recycle steam in the form of waste heat and condensate to the power generation or industrial process, and between the ammonia and fertilizer process, or gas to liquids and hydrogen process. Heat sinks and sources provide efficiency loops to condense water, and to cool and reheat gases prior to passing the gases over catalysts in the reaction zones. In certain embodiments, the chilled water that is used to cool various processes, such as for example for the removal of condensate, can receive primary cooling from nitrogen gas exiting the cold box of the air separation unit. The chilled water can be used for all chilled water requirements, and in certain embodiments can be supplemented with additional types of cooling or technologies.

In certain embodiments, ammonia can be produced by the Haber-Bosch process, wherein hydrogen and nitrogen gases are passed over an iron catalyst. Separation of hydrogen from the synthesis gas, concentration of the carbon-dioxide, removal of condensate, and temperature and pressure control can be performed prior to passing hydrogen over the iron catalyst and blending with nitrogen to form ammonia. Nitrogen separated by the air separation unit that bypasses the combustion process can be supplied directly to the ammonia production step. In certain embodiments, the nitrogen exiting the air separation unit can be utilized for cooling loads. In certain embodiments, excess nitrogen can be separated and sold. Alternatively, in certain embodiments, excess nitrogen can be used as a cooling medium and vented.

In one embodiment directed to the production of urea, compressed carbon dioxide is removed prior to the production of ammonia. The carbon dioxide can then be combined with the ammonia for synthesis of ammonium carbamate. Heat can be supplied from an associated process, such as urea process looping or auxiliary steam, and used to strip excess carbon dioxide and ammonia from the ammonium carbamate. Two separate recycle loops can thus be formed; a first loop for the production of urea and water, and the second loop for the recycle of excess gases. Excess water can be removed, for example by evaporation, prior to the prilling or granulation process.

Exothermic reactions in the urea processes described herein, and which produce steam and/or heat, can discharge the steam to the heat recovery steam generator or auxiliary equipment. Reduced pressure and temperature steam can be returned for heat recovery. Cooling in the ammonia and fertilizer production process can be done with condensate and chill water loops in the polygeneration process.

Excess gases produced as a byproduct of the various reactions described herein can be recovered and sold. For example, nitrogen produced by air separation unit 180, and supplied to nitrogen gas heat exchanger 184, can be used for cooling and for the production of ammonia. Excess nitrogen can be sold or can be vented. Inert gases can be stripped by air separation unit 180, such as argon, can be sold or vented, if below emission limits.

In certain embodiments, water returning to the condensate system can optionally be diverted to the hydrogen generator 206 via line 202. Oxygen produced by hydrogen generator 206 can be supplied to oxygen supplied partial oxidation process 106 via line 208. Hydrogen produced by hydrogen generator can be supplied to fourth reactor 214 for the production of ammonia via line 212. Excess water supplied to hydrogen generator 206 can be recovered via line 210.

Use of Vacuum Pressure Swing Adsorption and Pressure Swing Adsorption

Figure 2:
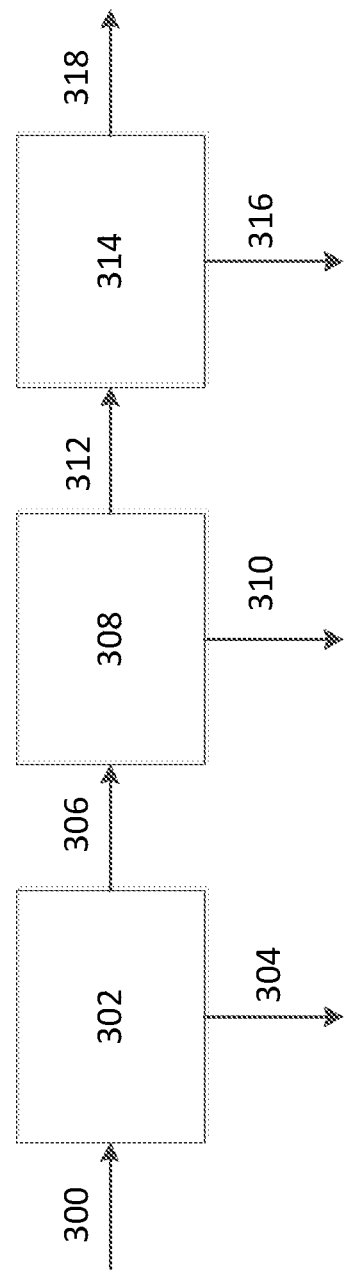
FIG. 2 shows an embodiment of the process which employs a VPSA in conjunction with a PSA.

In another embodiment, as shown in FIG. 2, a vacuum pressure swing adsorption process takes the place of carbon dioxide removal unit in an oxygen supplied partial oxidation process, such as the carbon dioxide removal process 144 in FIG. 1. In such an embodiment, the product stream exiting a condenser after water-gas shift reactors following an oxygen supplied partial oxidation process is supplied via line 300 to vacuum pressure swing adsorption process 302 to produce a carbon dioxide-rich stream 304 and a hydrogen-rich stream 306. The carbon dioxide-rich stream 304 includes carbon dioxide between 90 to 99 mol %, preferably above 99.9 mol %. The hydrogen-rich stream 306 includes hydrogen between 90 to 95 mol %, preferably above 99 mol %.

Hydrogen-rich stream 306 is supplied to pressure swing adsorption process 308. Pressure swing adsorption process 308 produces pure hydrogen stream 310 and pressure swing adsorption tail gas 312. Pure hydrogen stream 310 may then be supplied to hydrogen consuming processes, such as the ammonia production process in the fourth reactor 214 provided in FIG. 1. Pressure swing adsorption tail gas 312 can then be recycled to water-gas shift reactors, such as the first reactor 120 and the second reactor 128 as provided in FIG. 1, or to an oxygen supplied partial oxidation process 106 as provided in FIG. 1, or to vent to atmosphere where permitted by law, a fuel cell, or thermal oxidizer with or without catalytic pollution control and with or without heat recovery. Pressure swing adsorption tail gas 312 can optionally be supplied to a membrane separator 314 that produces a permeate stream 316 and retentate stream 318. Permeate stream 316 may be supplied to the ammonia production process, such as the fourth reactor 214 provided in FIG. 1. Retentate recycle 318 may be supplied to water-gas shift reactors, such as the first reactor 120 and the second reactor 128 as provided in FIG. 1, or to an oxygen supplied partial oxidation process 106 as provided in FIG. 1. Retentate recycle 318 may also be purged and/or supplied to a thermal oxidizer with or without a catalyst to convert carbon monoxide to carbon dioxide and vented to air.

Figure 3:
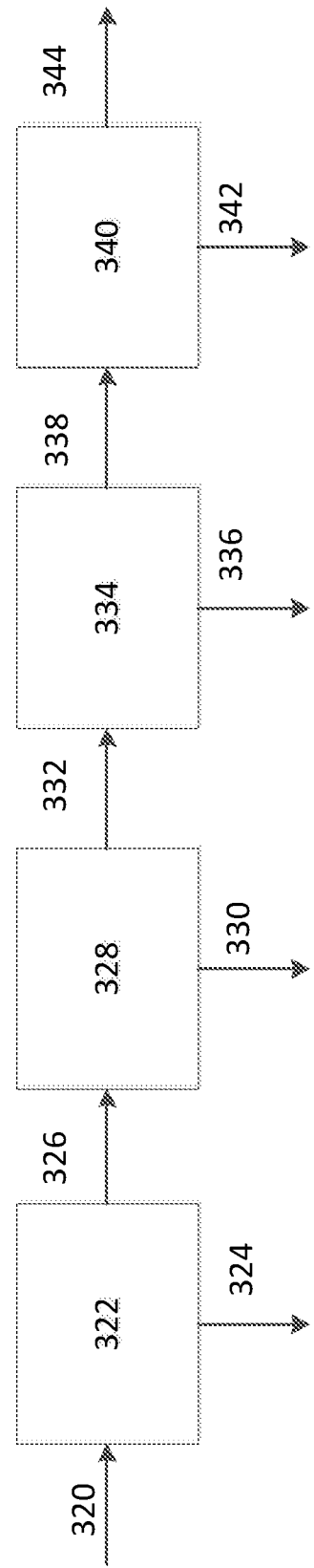
FIG. 3 shows an embodiment of the process which employs a VPSA in conjunction with an amine separator unit and a PSA.

In another embodiment, as shown in FIG. 3, hydrogen-rich stream 326 is fed to amine separator unit 328 to produce residual pure carbon dioxide stream 330 and amine treated high hydrogen content stream 332. Amine treated high hydrogen content stream 332 is then supplied to pressure swing adsorption process 334 as described above. In such embodiments, a vacuum pressure swing adsorption process is used in conjunction with a solvent-based carbon dioxide removal unit in an oxygen supplied partial oxidation process. In such an embodiment, product stream exiting a condenser after water-gas shift reactors following an oxygen supplied partial oxidation process is supplied via line 320 to vacuum pressure swing adsorption process 322 to produce a carbon dioxide-rich stream 324 and a hydrogen-rich stream 326. The carbon dioxide-rich stream 324 includes carbon dioxide between 90 to 99 mol %, preferably above 99.9 mol %. The hydrogen-rich stream 326 includes hydrogen between 90 to 95 mol %, preferably above 99 mol %.

Hydrogen-rich stream 326 is supplied to a carbon dioxide removal process, such as an amine separator unit 328 to produce residual pure carbon dioxide stream 330 and amine treated hydrogen-rich stream 332. Amine treated hydrogen-rich stream 332 is then supplied to pressure swing adsorption process 334. Pressure swing adsorption process 334 produces pure hydrogen stream 336 and pressure swing adsorption tail gas 338. Pure hydrogen stream 336 may then be supplied to ammonia production process, such as the fourth reactor 214 provided in FIG. 1. Pressure swing adsorption tail gas 338 can then be recycled to water-gas shift reactors, such as the first reactor 120 and the second reactor 128 as provided in FIG. 1, or to an oxygen supplied partial oxidation process 106 as provided in FIG. 1, or to vent to atmosphere where permitted by law, a fuel cell, or thermal oxidizer with or without catalytic pollution control and with or without heat recovery. Pressure swing adsorption tail gas 338 can optionally be supplied to a membrane separator 340 that produces a permeate stream 342 and retentate stream 344. Permeate stream 342 may be supplied to the ammonia production process, such as the fourth reactor 214 provided in FIG. 1. Retentate stream 344 may be supplied to water-gas shift reactors, such as the first reactor 120 and the second reactor 128 as provided in FIG. 1, or to an oxygen supplied partial oxidation process 106 as provided in FIG. 1. Retentate recycle 318 may also be purged and/or supplied to a thermal oxidizer with or without a catalyst to convert carbon monoxide to carbon dioxide and vented to air.

The vacuum pressure swing adsorption ("VPSA") process can include any known VPSA processes, also known as Vacuum Swing Adsorption ("VSA"). A VPSA process is a gas separation process that uses adsorbents and manipulation of pressure and temperature to separate gases; this process is conducted under pressure and vacuum conditions to purge the gas, using differential pressure and partial pressure of gas to release the adsorbed gas from the collection matrix. These adsorbents typically are in the form of a molecular sieve, zeolite, molecular gate, or mechanical sieve. Any known adsorbents useful for separating gases may be used in embodiments described herein. In certain embodiments, the adsorbents will vary based on the composition of the gas products being supplied to the VPSA process. In certain embodiments, the VPSA process is a single stage process. In other embodiments, the VPSA process is a double stage process. The VPSA process can have a single bed of adsorbent. In other embodiments, the VPSA process can include multiple beds of adsorbents. In certain embodiments, the VPSA can be operated with a methanator and without a PSA. Under this embodiment, the methanator will remove the remaining carbon monoxide and carbon dioxide to a hydrogen purity of at least 98 mol %, in some instances 99.5 mol %.

The pressure swing adsorption ("PSA") process can include any known PSA processes. In general, a PSA process is a gas separation process that uses adsorbents and manipulation of pressure and temperature to separate gases; this process is conduct under pressure conditions, using differential pressure and partial pressure of gas to release the adsorbed gas from the collection matrix. These adsorbents typically are in the form of an activated carbon, molecular sieves, silica gels, aluminas or zeolites. However, any known adsorbents useful for separating gases may be used in embodiments described herein. Carbon dioxide-rich stream 304 and 324 and/or residual pure carbon dioxide stream 330 may be removed from the system as a salable product or fed to other systems, such as systems for making urea.

Membrane separators removes hydrogen from the pressure swing adsorption tail gas 312 or 338. In some embodiments, the membrane separator is a polymer lined cord. Such membrane separators may be obtained from numerous suppliers. In further embodiments, the membrane separator may be replaced by, or used in conjunction with, a ceramic filter or a fuel cell to filter or use the hydrogen in the pressure swing adsorption tail gas 312 or 338.

In some embodiments, amine separator unit 328, or other such processes described for carbon dioxide removal process 144, may be an added step between vacuum pressure swing adsorption process 322 and pressure swing adsorption process 334. This addition of an amine separation step may allow for removal of remaining carbon dioxide, of recirculation of the carbon dioxide is not desired or necessary. In further embodiments, amine separator unit 328 is performed using a low volume amine separator. In further embodiments, amine separator unit 328 is performed using compression amine separation. Compression amine separation may be employed when carbon dioxide recirculation is not desired. In further embodiments, amine separator unit 328 may need to be pressurized in order to optimize amine removal of carbon dioxide.

In some embodiments, at least about 90 mol % of the carbon dioxide in the gas vapors exiting first condenser 132 that are supplied via line 134 to line 300 or 320 are removed by vacuum pressure swing adsorption process 302 or 322 to produce carbon dioxide-rich stream 304 or 324. In some embodiments, at least about 91 mol % of the carbon dioxide in the gas vapors exiting first condenser 132 that are supplied via line 134 to line 300 or 320 are removed by vacuum pressure swing adsorption process 302 or 322 to produce carbon dioxide-rich stream 304 or 324. In some embodiments, at least about 92 mol % of the carbon dioxide in the gas vapors exiting first condenser 132 that are supplied via line 134 to line 300 or 320 are removed by vacuum pressure swing adsorption process 302 or 322 to produce carbon dioxide-rich stream 304 or 324. In some embodiments, at least about 93 mol % of the carbon dioxide in the gas vapors exiting first condenser 132 that are supplied via line 134 to line 300 or 320 are removed by vacuum pressure swing adsorption process 302 or 322 to produce carbon dioxide-rich stream 304 or 324.

In some embodiments, at least about 80 mol % of the hydrogen in hydrogen-rich stream 306 is removed by pressure swing adsorption process 308 to produce pure hydrogen stream 310. In some embodiments, at least about 70 mol % of the hydrogen in in hydrogen-rich stream 306 is removed by pressure swing adsorption process 308 to produce pure hydrogen stream 310. In some embodiments, at least about 81 mol % of the hydrogen in in hydrogen-rich stream 306 is removed by pressure swing adsorption process 308 to produce pure hydrogen stream 310. In some embodiments, at least about 82 mol % of the hydrogen in in hydrogen-rich stream 306 is removed by pressure swing adsorption process 308 to produce pure hydrogen stream 310. In some embodiments, at least about 83 mol % of the hydrogen in in hydrogen-rich stream 306 is removed by pressure swing adsorption process 308 to produce pure hydrogen stream 310. In some embodiments, at least about 84 mol % of the hydrogen in in hydrogen-rich stream 306 is removed by pressure swing adsorption process 308 to produce pure hydrogen stream 310. In some embodiments, at least about 85 mol % of the hydrogen in in hydrogen-rich stream 306 is removed by pressure swing adsorption process 308 to produce pure hydrogen stream 310. In some embodiments, at least about 86 mol % of the hydrogen in in hydrogen-rich stream 306 is removed by pressure swing adsorption process 308 to produce pure hydrogen stream 310. In some embodiments, at least about 87 mol % of the hydrogen in in hydrogen-rich stream 306 is removed by pressure swing adsorption process 308 to produce pure hydrogen stream 310. In some embodiments, at least about 88 mol % of the hydrogen in in hydrogen-rich stream 306 is removed by pressure swing adsorption process 308 to produce pure hydrogen stream 310. In some embodiments, at least about 89 mol % of the hydrogen in in hydrogen-rich stream 306 is removed by pressure swing adsorption process 308 to produce pure hydrogen stream 310. In some embodiments, at least about 90 mol % of the hydrogen in in hydrogen-rich stream 306 is removed by pressure swing adsorption process 308 to produce pure hydrogen stream 310.

In some embodiments, the carbon dioxide-rich stream 304 or 324 and/or residual pure carbon dioxide stream 330 has a purity of at least about 90 mol %. In some embodiments, the carbon dioxide-rich stream 304 or 324 and/or residual pure carbon dioxide stream 330 has a purity of at least about 95.0 mol %. In some embodiments, the carbon dioxide-rich stream 304 or 324 and/or residual pure carbon dioxide stream 330 has a purity of at least about 96 mol %. In some embodiments, the carbon dioxide-rich stream 304 or 324 and/or residual pure carbon dioxide stream 330 has a purity of at least about 97 mol %. In some embodiments, the carbon dioxide-rich stream 304 or 324 and/or residual pure carbon dioxide stream 330 has a purity of at least about 97.5 mol %. In some embodiments, the carbon dioxide-rich stream 304 or 324 and/or residual pure carbon dioxide stream 330 has a purity of at least about 98.5 mol %. In some embodiments, the carbon dioxide-rich stream 304 or 324 and/or residual pure carbon dioxide stream 330 has a purity of at least about 99.0 mol %. In further embodiments, the carbon dioxide-rich stream 304 or 324 additionally contains water. In further embodiments, the carbon dioxide-rich stream 304 or 324 additionally contains argon. In further embodiments, the carbon dioxide-rich stream 304 or 324 additionally contains nitrogen. In further embodiments, the carbon dioxide-rich stream 304 or 324 additionally contains carbon monoxide.

In some embodiments, the pure hydrogen stream 310 or 336 has a purity of at least about 98 mol %. In some embodiments, the pure hydrogen stream 310 or 336 has a purity of at least about 98.5 mol %. In some embodiments, the pure hydrogen stream 310 or 336 has a purity of at least about 99.0 mol %. In some embodiments, the pure hydrogen stream 310 or 336 has a purity of at least about 99.5 mol %. In some embodiments, the pure hydrogen stream 310 or 336 has a purity of at least about 99.9 mol %. In some embodiments, the pure hydrogen stream 310 or 336 has a purity of at least about 99.99 mol %. In some embodiments, the pure hydrogen stream 310 or 336 has a purity of at least about 99.999 mol %. In some embodiments, the pure hydrogen stream 310 or 336 has less than about 0.5 ppm elemental oxygen. In some embodiments, the pure hydrogen stream 310 or 336 has less than about 1 ppm elemental oxygen. In some embodiments, the pure hydrogen stream 310 or 336 has less than about 2 ppm elemental oxygen. In some embodiments, the pure hydrogen stream 310 or 336 has less than about 5 ppm elemental oxygen. In some embodiments, the pure hydrogen stream 310 or 336 has less than about 10 ppm elemental oxygen. In some embodiments, the pure hydrogen stream 310 or 336 has less than about 15 ppm elemental oxygen. In some embodiments, the pure hydrogen stream 310 or 336 has less than about 20 ppm elemental oxygen. In some embodiments, the pure hydrogen stream 310 or 336 has less than about 25 ppm elemental oxygen. In other embodiments, the pure hydrogen stream 310 or 336 is free of nitrogen. In other embodiments, the pure hydrogen stream 310 or 336 is free of argon.

Gas vapors exiting first condenser 132 that are supplied via line 134 to line 300 or 320 can include, in some embodiments, between about 50-78 mol % hydrogen, about 17-37 mol % carbon dioxide, and about 0-3 mol % carbon monoxide.

In one aspect, the present invention utilizes the air separation unit cold box effluent gases as heat sinks for cooling of hot effluent exhaust gases from an oxygen supplied partial oxidation process. While described herein as an aspect of the invention utilizing oxygen supplied partial oxidation exhaust gases for the feedstock in the production of urea and other nitrogen based fertilizers, it is understood that the use of air separation unit gases as heat sinks to provide cooling can be applied to any process requiring cooling, and that the urea production described herein is just one example. For example, the air separation unit gases can also be used for combined cycle power plant inlet air cooling. Cooling of the discharge steam or gas treatment heat exchangers can be done with chilled water or with cold box effluent gases of the air separation passing through heat exchangers, thus eliminating the need for the external cooling water for evaporative cooling or air cooled condensers. In certain embodiments, any air separation unit situated near a power plant or steam process needing cooling can be utilized such that the air separation unit cold box gases provide a heat sink, thereby preventing water consumption that impacts the environment, or alternatively preventing requirements of extra energy use for air cooled heat exchangers, and capital and materials cost of extremely large equipment needed to provide this alternative cooling.

In one aspect, the first reactor 120 can be provided with a heat regenerative loop to first heat exchanger 116 for temperature control. In another embodiment, heat from the water gas shift reaction first heat exchanger 116 and second heat exchangers 124 or first condenser 132 can be used for regeneration of the carbon dioxide recovery unit 190.

In one embodiment, the ammonia refrigeration unit cold nitrogen output may be used as a heat sink for the chilled water system to increase ammonia to ambient temperature in storage while reducing water consumption through cooling water evaporation.

Figure 4:
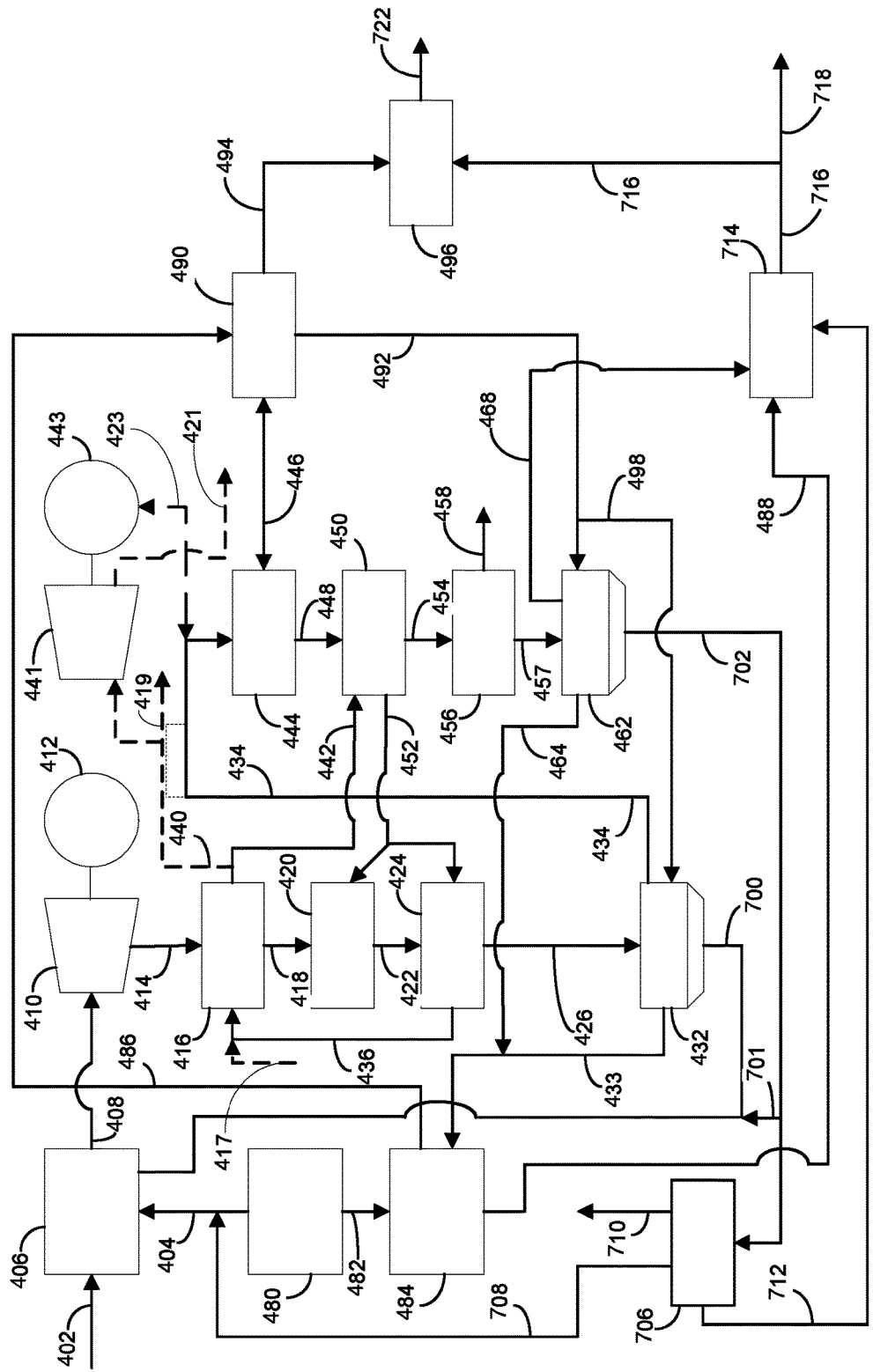
FIG. 4 shows an embodiment of the process where the second reactor is not utilized.

Hydrogen Production Using Partial Oxidation Gas Turbine with Single Stage Water Gas Shift FIG. 4 illustrates another embodiment of the method for the production of ammonia and/or urea from the product streams of an oxygen supplied partial oxidation process. In the method, a hydrocarbon fuel source, such as methane or syngas, supplied via line 402 and oxygen supplied via line 404 are combined in oxygen supplied partial oxidation process 406 to produce a first product stream. The first product stream can be supplied via line 408 to power turbine 410, which removes a portion of the heat and produces energy with power generator 412 connected thereto. Other fuel sources can be used, as described above. Other hydrocarbon fuels heat transfer mechanisms may include a boiler (heat exchanger) with a secondary steam cycle or high contaminant turbine to transfer the energy of the synthesis gas and pass the gas via line 414 to the first heat exchanger 416. In further embodiments, contaminant removal systems are employed, as described above.

The first product stream exits power turbine 410 at high temperature, typically at a temperature that is greater than about 475° C., alternatively between about 360° C. and 500° C., alternatively about 495° C., via line 414, and include a mixture of carbon monoxide, hydrogen, carbon dioxide, oxygen, water (for example, as steam), and inert gases. Although the water gas shift reactor can operate at lower temperatures during lower capacity, this is the desired operating condition at normal operations. In certain embodiments, the first output stream at line 414 includes between about 35 and 65 mol. % hydrogen, about 0.5-25 mol. % carbon dioxide, and between about 10 and 25 mol. % carbon monoxide. In an alternate embodiment, the gas mixture can include between about 35 and 40 mol. % hydrogen, between about 1 and 3 mol. % carbon dioxide, and between about 17 and 23 mol. % carbon monoxide. The exact ratio of the first product stream depends on the exact composition of the hydrocarbon fuel source (i.e., methane, syngas, or other hydrocarbon source), amount of water injected at line 417 for desuperheating, and upon the stoichiometric balance of oxygen and fuel supplied to the partial oxidation process 406.

Conversion of carbon to mostly carbon monoxide and carbon dioxide and hydrogen to water is possible in a stoichiometric balance or an excess oxygen environment at line 408. In certain embodiments, a 3:1 ratio of hydrogen to carbon will be achieved at line 408. When the ratio of hydrogen to carbon is less than 3:1, as evidenced by a lack of free hydrogen at line 408, and as also seen by the amount of hydrogen produced at line 468, in certain embodiments, additional hydrogen can be supplied by hydrogen generator 706 via line 712 to the ammonia production process in third reactor 714 and additional oxygen can be supplied to partial oxidation process 406 via lines 404 and 708. In certain embodiments, the partial oxidation process product synthesis gas can have a ratio of hydrogen to carbon of between about 2:1 and 4:1, alternatively between about 2.5:1 and 3.5:1. In certain embodiments the ratio is between about 2.9:1 and 3.1:1, alternatively about 3:1. In certain embodiments, the process does not limit the ratio of hydrogen to carbon within these limits, but they are preferred for optimized production and efficiency. Not all embodiments will require the hydrogen generator as a source of hydrogen; the source of hydrogen can come from other industrial sources when the hydrogen supply is not adequate for a 3:1 ratio. The addition of hydrogen from a hydrogen generator can provide additional hydrogen, as needed to produce the desired hydrogen to carbon ratio entering the process cycle for production of hydrogen. In certain embodiments, the fuel flow can control the production of carbon-oxides entering the system in stoichiometric balance or un-balance with oxygen entering the process. In certain embodiments, a fuel-rich, oxygen-lean process may result in uncombined carbon being formed. Uncombined carbon can foul the system as carbon black or coke, therefore oxygen and fuel ratio needs to be controlled to prevent or minimize uncombined carbon. The partial oxidation process can be modified to optimize the ratio of components in the first product stream for highest efficiency and desired synthesis gas ratios. Oxidized hydrogen from the synthesis gas will produce water, which can be supplied from the condenser to the hydrogen generator for production of hydrogen, injected into the fourth reactor via line 712, returning the chemical balance back to a ratio to support the production of ammonia.

In certain embodiments, fuel flow can control the production of carbon-oxides entering the system in stoichiometric balance or un-balance with oxygen entering the process. In certain embodiments, a fuel-rich, oxygen-lean process may result in uncombined carbon being formed. Uncombined carbon can foul the system as carbon black or coke, therefore the oxygen and fuel ratio needs to be controlled to prevent or minimize uncombined carbon. The oxygen supplied partial oxidation process can be modified to optimize the ratio of components in the first product stream for highest efficiency and desired product stream ratios.

The first product stream in line 414 can optionally be supplied to first heat exchanger 416 to control the temperature of the gases for further processes. When the fuel source is synthesis gas supplied, for example, by an integrated gasification cycle, carbon dioxide produced as a byproduct can be injected into line 494, if the carbon dioxide is pure, or into line 414 if the carbon dioxide is not pure and further treatment is needed for carbon monoxide and carbon dioxide clean-up. First heat exchanger 416 can be of any type known in the art, such as steam generator. The size of first heat exchanger 416 can be selected based upon the cooling required to reduce the temperature of the first product stream in line 414. The first product stream exiting first heat exchanger 416 supplied via line 418 to first reactor 420, which is a medium temperature water gas shift reactor or isothermal reactor and includes an appropriate isothermal shift reaction catalyst. In certain embodiments, there may be no need for recompression with a compressor. There is a lower steam requirement, and the steam can be added back to the partial oxidation reactor if needed. The first product stream exits first heat exchanger via line 418 at a temperature selected based upon the first reactor catalyst requirements. For example, in certain embodiments, the first heat exchanger can be configured to reduce the temperature of the first product stream in line 414 to less than about 300° C., alternatively less than about 295° C., alternatively less than about 290° C., alternatively less than about 285° C., alternatively less than about 275° C., alternatively between about 220° C. and 270° C., alternatively between about 220° C. and 260° C., alternatively between about 230° C. and 275° C., or alternatively between about 230° C. and 250° C. It is understood that one of skill in the art may select alternate catalysts for the isothermal shift reactors described herein, which may require a different input temperature.

The second product stream exiting first reactor 420 can be supplied to second heat exchanger 424 via line 422. The second product stream includes carbon monoxide, water, carbon dioxide and hydrogen gases. In certain embodiments, second heat exchanger 424 can reduce the temperature of the gases to less than about 250° C., alternatively less than about 225° C., alternatively to between about 205° C. and 215° C. In certain embodiments, this second heat exchanger can be removed in its entirety and the second product stream can be supplied directly to a condenser or a carbon dioxide removal process.

Steam or hot water supplied via line 436 from second heat exchanger 424 can be heated in first heat exchanger 416 while reducing the temperature of turbine exhaust gases exiting power turbine 410 via line 414. Make up steam or water can be provided to the process via line 417, and can be supplied from an associated process. Steam discharged via line 442 from first heat exchanger 416 can be supplied to third heat exchanger 450, which is then supplied via line 452 to second heat exchanger 424 or to the boiler feedwater of first reactor 420. Excess steam from first heat exchanger 416 can be supplied via line 440 and used to drive steam turbine 441 and/or drive compressor 443. Alternately, excess steam removed via line 440 can be removed from the system to provide heating for an associated process via line 419.

Steam turbine 441 can be coupled to and drive compressor 443, which can be utilized for required gas compression loads. In certain embodiments, a motor-generator can be attached to the same compressor shaft and operate as a motor for start-ups and shutdowns. Steam supplied via line 440 can be used to convert the motor to a generator as supply pressure overcomes the load of the compressor, unloading the motor, and eventually supplying enough torque to run both the compressor and motor as a compressor and generator. In certain embodiments, motor-generator can include slip rings and brushes or a permanent magnet generator for the field magnetism. In certain larger installations, multiple turbine units and motors can be used to meet redundancy requirements. Once redundancy requirements are met for start-up and shutdown reliability, a turbine-generator or turbine-compressor may be added to provide power generation or gas compression with excess steam. As is understood by one of skill in the art, not all turbine shafts will include motor-generator drives. The motor-generator drive advantageously facilitates the start-up and shutdown processes, and can reduce both the cost of the equipment and the number of shafts needed per piece of equipment. In certain embodiments, saturated steam can be removed from steam turbine 441 and supplied to a condenser, or to an associated process. Carbon dioxide can be supplied from first condenser 432 via line 434 for compression by drive compressor 443 via line 423, and supplied to the carbon dioxide removal process 444 via a parallel line 423. A load control valve between lines 434 and line 423 will select the load of the compressor if needed and cycle the compressor into service mode, modulate mode, and out of service (unloaded). Some embodiments may not have need for the compressor if backpressure turbines and condensers are used for power turbine 410 and first condenser 432, and if the pressure is adequate to provide flow into carbon dioxide removal process 444 via line 434 directly. Optionally, steam can also be released via steam outlet 421.

The second product stream exiting first reactor 420 via line 422 can be optionally supplied to second heat exchanger 424 to control the temperature of the gases, and then supplied via line 426 to first condenser 432. Generally, the second product stream will be saturated with water vapor. The water vapor in first condenser 432 is cooled by chilled water supplied via line 498, which itself can be cooled by various means, such as with gases (e.g., nitrogen) provided by air separation unit 480. In certain embodiments, the nitrogen gas from air separation unit 480 can be supplied to nitrogen gas heat exchanger 484 via line 482, having a temperature of between about 4-21° C., or in some embodiments 10-40° C., as necessary to facilitate the condensation of water from the produced gases. Condensate water removed from first condenser 432 via line 700 can be supplied to oxygen supplied partial oxidation process 406, to the hydrogen generator 706, to the heat exchangers, to excess water sales, or to an associated process for urea production, such as granulation or prilling. Water from first condenser 432 can also be fed via line 433 to the nitrogen gas heat exchanger 484.

The third product stream exiting first condenser 432 via line 434 through air separation baffles will primarily include a ratio of hydrogen and carbon, possibly also including small or trace amounts of carbon monoxide and inert gases. In certain embodiments, the third product stream includes about 65-75 mol % hydrogen, about 20-30 mol % carbon dioxide, about 1-5 mol % carbon monoxide, and trace inert gases. The third product stream supplied via line 434 is supplied to carbon dioxide removal process 444. In certain embodiments, a vacuum pump or drive compressor 443 is placed in carbon dioxide removal line 434 to extract gases from the condenser baffles and discharge to the carbon dioxide removal process 444 if there is a vacuum in the first condenser 432 due to the collapse of the volume of steam to water. When backpressure type turbines are used to match the turbine design parameters, the carbon dioxide rich gas flow may not require the compressor to transfer gas from the condenser to the next stage of carbon dioxide removal process due to maintained positive pressure in the condenser.

In certain embodiments, carbon dioxide removal process 444 removes carbon dioxide using an extraction media supplied, such as an amine based solutions, such as MDEA (methyldiethanolamine), MEA (monoethanolamine), Ucarsol™, DGA (diglycolamine) and the like. In certain embodiments, carbon dioxide removal process 444 can employ the Rectisol™ removal process. In certain embodiments, mechanical separation, water wash, or pressure/temperature swing adsorption, or vacuum swing adsorption, or combinations thereof may be used to separate the hydrogen and carbon dioxide streams as part of the carbon dioxide removal process. The carbon dioxide is then recovered in carbon dioxide recovery unit 490, which separates the amine based extraction media from the carbon dioxide. The carbon dioxide-lean amine based extraction media can then be recycled via line 446 to carbon dioxide removal process 444, which can cycle the extraction media in a rich and lean process loop. The amine can be condensed with chilled water from the chill water system flow supplied via line 486, which exits from carbon dioxide recovery unit 490 via line 492. A high purity carbon dioxide stream can then be supplied to fourth reactor 496 via line 494, or alternatively can be recovered or supplied to an alternate associated process (not shown in FIG. 4). Water exiting from carbon dioxide recovery unit 490 can fed directly to second condenser 462 via line 492 or split to be also fed to first condenser 432 via line 498.

The fourth product stream exiting the carbon dioxide removal process 444 includes hydrogen gas having a purity of greater than about 95 mol %, preferably at least about 99 mol %, and uncaptured carbon dioxide and carbon monoxide. This stream is supplied to third heat exchanger 450 via line 448. The gases can be heated to a desired temperature and supplied via line 454 to second reactor 456. The second reactor includes a catalyst suitable for the production of methane (i.e., methanation). The temperature to which the gases are heated or cooled is selected based upon the catalyst specification for the catalyst present in second reactor 456.

This second reactor 456 converts the remaining trace amounts of carbon dioxide and carbon monoxide, along with hydrogen, into methane and water vapor. The second reactor 456 can include a catalyst suitable for the conversion of carbon monoxide to methane, including those that contain transition metals including Ni, Fe, Co, Ru, Mo, etc. dispersed on metal oxide supports such as $Al_2O_3$, $SiO_2$, $TiO_2$, $ZrO_2$, $CeO_2$, etc., and a range of other oxidic and pre-reduced catalysts. In an embodiment employing the Haber-Bosch process, the catalyst can include $Ni/Al_2O_3$ and the gas inlet temperature can be about 325° C. The conversion generally takes place in two primary reactions, $CO+3H_2 \rightarrow CH_4+H_2O$ and $CO_2+4H_2 \rightarrow CH_4+2H_2O$. Methane and water produced by the reactions can be removed via line 458 for further separation (for example, by pressure swing adsorption (PSA), condensation, membrane technologies, and the like), and returned to the inlet of the oxygen supplied partial oxidation process 406 as fuel gas.

A highly pure hydrogen stream, having a purity of at least about 98.0 mol % exiting the second reactor 456 via line 457 with any excess water, is supplied to second condenser 462. Water is condensed and removed via line 702, and the highly pure hydrogen is supplied via line 468 to third reactor 714 for the production of ammonia. Water is condensed from the gas stream supplied via line 457 through condensation with chilled water via line 492. The hydrogen gas can exit through gas separation baffles to the ammonia process via line 468. Condensate water can be supplied from line 702 to hydrogen generator 706, or combined via line 701 with water from first condenser 432 to be supplied to the oxygen supplied partial oxidation process 406. Water from second condenser 462 can also be fed via line 464 to the nitrogen gas heat exchanger 484. In certain embodiments, excess water can be removed from lines 700, 701, and/or 702 (not shown), as needed. Similarly, make-up water can be added to the system via lines 700, 701, and/or 702 (not shown), as needed.

Third reactor 714 is supplied with hydrogen gas from the second condenser 462 via line 468 and from the hydrogen generator 706 via line 712, if supplemental hydrogen is needed. Third reactor 714 is supplied with nitrogen gas exiting the nitrogen gas heat exchanger 484 via line 488. Third reactor 714 includes a catalyst suitable for the production ammonia. In certain embodiments, the catalyst is an iron based catalyst, which can be promoted with potassium, calcium, and aluminum ($K_2O$, CaO and $Al_2O_3$). In certain embodiments, the catalyst may be a carbon fiber based matrix with a plating of palladium, ruthenium, nickel, rhodium, or combinations thereof. In certain embodiments, hydrogen and nitrogen are supplied to the reactor and passed over the catalyst to produce ammonia via the following reaction: $N_2+3H_2 \leftrightarrows 2NH_3$. In certain embodiments, make-up hydrogen gas can be supplied to line 468 by other means (not shown), or when excess hydrogen is present, removed for sale or supply to an associated process (not shown). In certain embodiments, excess nitrogen can be vented or provided to an alternate process (not shown), or in certain embodiments, additional nitrogen can be added to the system (not shown) as needed. Ammonia from third reactor 714 is supplied via line 716 to fourth reactor 496 for the preparation of urea, or extracted for collection or supply to an associated process via line 718.

In the fourth reactor 496 ammonia, having a purity of at least about 99 mol %, preferably at least about 99.9 mol %, supplied via line 716, is combined with carbon dioxide, having a purity of at least about 99 mol %, preferably at least about 99.9 mol %, supplied via line 494 to produce urea by the following reaction: $2NH_3+CO_2 \leftrightarrows NH_2COONH_4 \leftrightarrows NH_2CONH_2+H_2O$. In the reaction for the production of urea, for each mole of urea that is formed, one mole of water is also produced. This water produced as a by-product of the urea synthesis, can be removed (not shown) and sold or supplied to an associated process. Urea product can be sent via line 722 for collection or further processing, for example prilling and granulation. Additional processing for this particular embodiments is as described above.

Partial Oxidation Industrial Process with Isothermal Shift Reaction Process

Figure 5A:
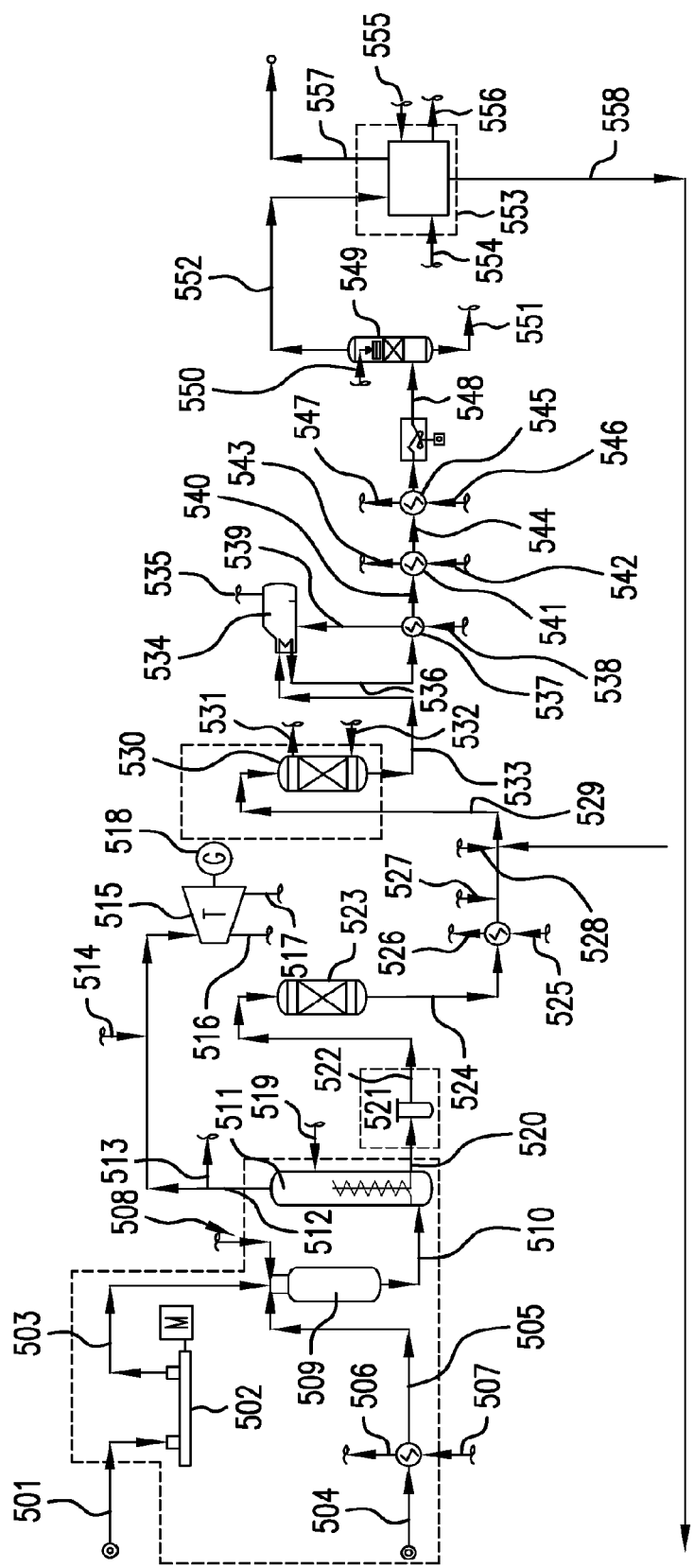
FIGS. 5A and 5B are illustrations of a method, according to an exemplary embodiment of the invention.
Figure 5B:
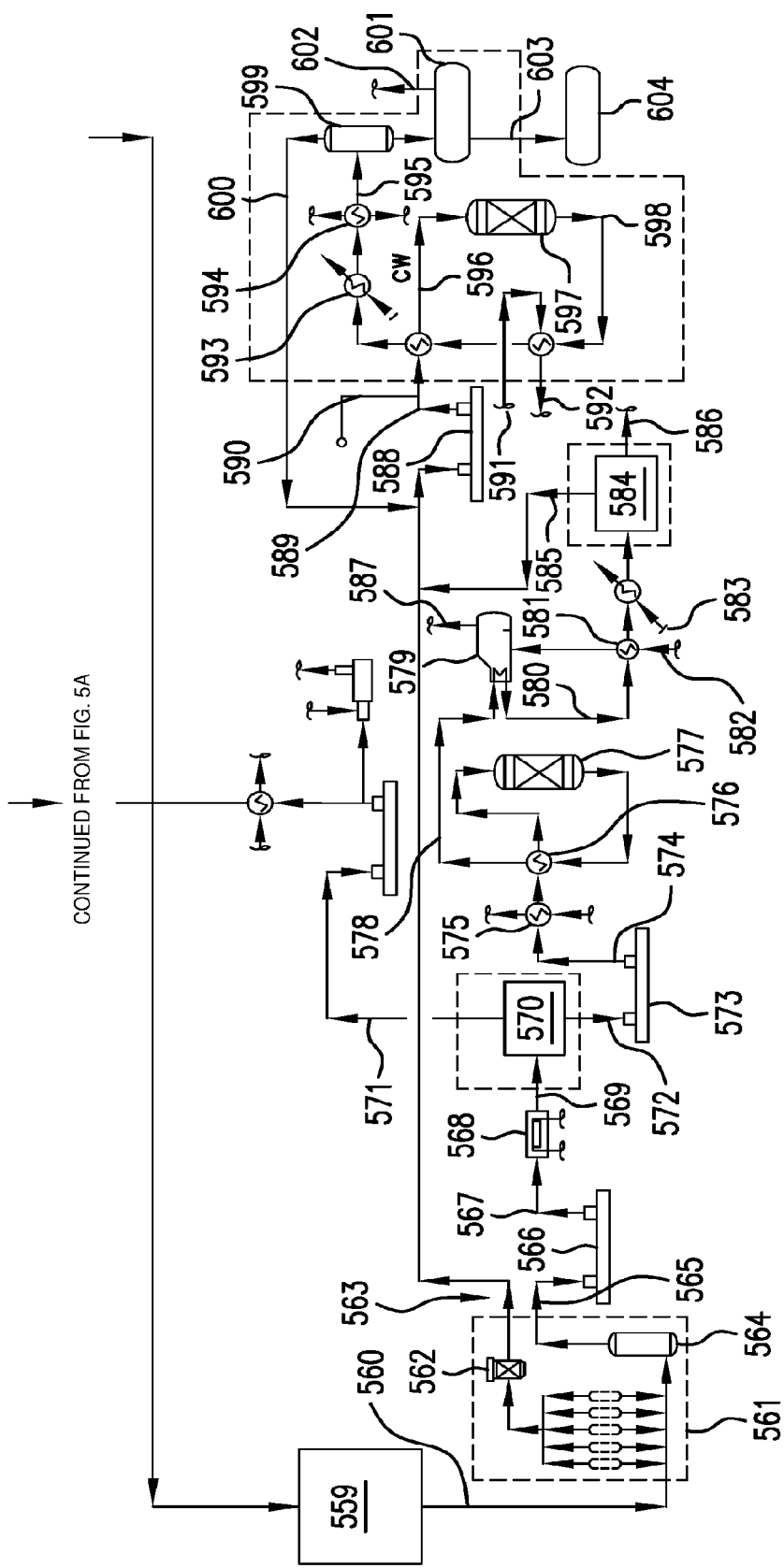

Certain embodiments of the method include an oxygen supplied partial oxidation process coupled with an isothermal shift reaction process. FIGS. 5A and 5B are illustrations of a method, according to this exemplary embodiment of the invention. Here, a hydrocarbon feedstock is supplied via line 501 to a compressor 502. The output compressed feedstock is supplied via line 503 to an oxygen supplied partial oxidation process reactor 509. Oxygen exiting an air separation unit via line 504 is optionally supplied to a heat exchanger 505. High pressure steam is supplied via line 507 to the heat exchanger 505 and the temperature adjusted oxygen stream is supplied to the oxygen supplied partial oxidation process reactor 509 to produce a first product stream. Superheated steam is supplied via line 508 to the oxygen supplied partial oxidation process reactor 509. The first product stream exiting the oxygen supplied partial oxidation process reactor 509 is supplied via line 510 to a waste heat boiler 511. High pressure boiler feed water is supplied via line 519 to the waste heat boiler 511 and high pressure steam is supplied via line 512 to turbine 515 and generator 518; this steam can also be extracted from process via line 513 for use elsewhere in the system or supplemented with superheated steam via line 514. Low pressure steam and vacuum steam exit turbine 515 via line 516 and 517. A second product stream produced by processing of the first product stream exits the waste heat boiler 511 via line 520 to a soot removal process 521.

The second product stream after removal of soot exits via line 522 and is supplied to a sulfur removal process 523. In certain embodiments, the sulfur removal process is placed upstream of the partial oxidation process. But placing the sulfur removal process 523 downstream of the oxygen supplied partial oxidation process allows the sulfur to act as a lubricant in the oxygen supplied partial oxidation process, and also reduces the energy costs. Exemplary sulfur removal systems include wet scrubbing using a slurry of alkaline absorbent, usually limestone or lime, or seawater to scrub gases; spray-dry scrubbing using similar absorbent slurries; wet sulfuric acid process; and dry sorbent injection systems. In further embodiments, the sulfur removal system includes a catalyst or a solvent or water wash.

The third product stream exits the sulfur removal process via line 524 and is optionally subject to heat exchanger 525. The heat exchanger is supplied with boiler feed water 526. Medium high pressure steam and high pressure steam are supplied via lines 527 and 528 to the third product stream to adjust the temperature of the stream supplied to the isothermal shift converter 530. Medium high pressure boiler feed water is supplied to the isothermal shift converter vessel via line 532 and medium high pressure steam cycles out via line 531. The fourth product stream exiting after processing in the isothermal shift converter 530 is supplied to the steam generation process 534 and processed through a series of heat recovery units or syngas condensers 538, 541 and 545.

The fourth product stream exiting the syngas condensers via line 548 is supplied to a $NH_3$/HCN wash system 549 to remove $NH_3$ and HCN and obtain a fifth product stream. Demineralized water is supplied to the $NH_3$/HCN wash system 549 and the waste water is removed via line 551. In certain embodiments, this fifth product stream includes about 65-75 mol % hydrogen, 20-30 mol % carbon dioxide, 0.5-5 mol % carbon monoxide, and trace inert gases, and is supplied to via line 552 to carbon dioxide removal process 553. The make-up water and amine and low pressure steam are supplied via lines 554 and 555 to the carbon dioxide removal vessel. In certain embodiments, mechanical separation, water wash, or pressure/temperature swing adsorption, or vacuum swing adsorption, or enzyme-based carbon dioxide separation, or combinations thereof may be used to separate the hydrogen and carbon dioxide streams as part of the carbon dioxide removal process. A high purity carbon dioxide stream exits the carbon dioxide removal process 553 via line 557. For example, enzyme based carbon dioxide processing can involve custom carbonic anhydrase enzymes long with certain solvents for carbon capture. Required solvent amounts can be reduced and heat required to release carbon dioxide can also be reduced. Adding these $CO_2$ processing systems reduce operating cost and energy use, and increase plant electricity output.

In certain embodiments, the sixth product stream exiting the carbon dioxide removal process 553 includes hydrogen gas having a purity of greater than 95 mol %, preferably at least about 99 mol %, and uncaptured carbon dioxide and carbon monoxide. This stream is supplied via line 558 optionally to an enzyme-based carbon dioxide processing/recovery unit 559, with properties as described above.

In certain embodiments, the sixth product stream can be directly supplied to a pressure swing adsorption unit 561 to produce a highly pure hydrogen stream and a PSA tail gas stream. The highly pure hydrogen stream exiting the pressure swing adsorption unit 561 is supplied to filter dryer unit 562 and via line 563 to compressor 588 for further delivery to the production of ammonia. In certain embodiments, the highly pure hydrogen stream has a purity of at least about 98.0 mol %. The PSA tail gas stream can include, for example, hydrogen at about 73 mol %, nitrogen at about 7 mol %, carbon monoxide at about 9 mol %, argon at about 8 mol %, and water at about 0.8 mol %. The PSA tail gas stream can be further supplied to unit 564, which for example can be a separator, and then via lines 565 and 567 to compressor 566 and cooler 568. The compressed PSA tail gas stream is then supplied via line 569 to an optional membrane separator unit 570. The retentate stream 571 from the membrane separator unit 570 can be further supplied to a compressor 605 and supplied back to the product stream 529. The permeate stream 572 can be further supplied to a compressor 573 and heat exchangers 575 and 576, and further provided to a methanator 577. This methanator 577 converts the remaining trace amounts of carbon dioxide and carbon monoxide, into methane and water. Methane and water produced by the reactions can be removed for further separation (for example, by pressure swing adsorption (PSA), condensation, membrane technologies, and the like), and returned to the inlet of the oxygen supplied partial oxidation process as fuel gas.

In certain embodiments, the tail gas from compressor 566 is directed to the inlet of the isothermal shift reactor 530 and a purge stream to remove inert gas build-up can be sent to a thermal oxidizer with or without heat recovery and with or without catalytic reduction or vented to atmosphere where permitted by law. In this embodiment, the membrane separator and downstream systems would not be used.

A highly pure hydrogen stream, having a purity of at least about 98.0 mol % exiting the methanator 577 via line 578 with any excess water, is supplied to steam generation unit 579 and then supplied via line 580 to a hydrogen cooling process mediated by heat exchangers 581 and 582. The highly pure hydrogen is supplied via line 583 to water removal unit 584, such as a dehydration molecular sieve package. Waste water is removed via line 586 and the highly pure hydrogen stream is supplied via line 585 to line 563 to compressor 588 for further delivery to the production of ammonia.

Highly pure hydrogen stream, delivered via line 589 from the compressor 588 is combined with nitrogen gas supplied from the air separation unit via line 590 and heated to appropriate temperatures through use of heat exchangers. The nitrogen gas from the air separation unit, for example, can include nitrogen at about 99.9 mol % with about 10 ppmv of oxygen, and 1 ppmv of water. This gaseous mixture of nitrogen and hydrogen is supplied to catalytic reactor 597 to form anhydrous liquid ammonia. This step is known as the ammonia synthesis loop. Ammonia exits via line 598 and passes through a series of heat exchangers 592 and 593. Any residual hydrogen is separated from the ammonia stream in separator 599 and recycled via line 600 to the ammonia production process. The ammonia stream is further processed in unit 601, which can be a separator. Vent gas consisting of argon, nitrogen, and hydrogen and ammonia is allowed to flare, be sued as waste fuel in thermal destruction process, or vented to atmosphere where permitted by law via line 602. Pure ammonia exits via line 603 to storage tanks 604, or for further production of fertilizers such as urea.

Certain embodiments of the method include supplying the natural gas feedstock to the oxygen supplied partial oxidation process, and then supplying the product stream from the oxygen supplied partial oxidation process to an isothermal shift reactor. The output of the isothermal shift reactor is subjected to a carbon dioxide removal process as discussed above, and then the hydrogen-rich stream is subjected to direct methanation, without the use of the PSA or membrane separator units. This embodiment leads to a decrease in capital cost, power consumption, and CO emissions.

The following examples are provided to more fully illustrate some of the embodiments disclosed hereinabove. It should be appreciated by those of ordinary skill in the art that the methods disclosed in the example that follow represent techniques that constitute illustrative modes for practice of the disclosure. Those of ordinary skill in the art should, in light of the present disclosure, appreciate that many changes can be made in the specific embodiments that are disclosed and still obtain a like or similar result without departing from the spirit and scope of the disclosure.

Example of Production of Ammonia and Urea Using Pure Hydrogen Stream

In an example, the input stream is any hydrocarbon or carbonaceous feedstock, including natural gas, blended gas, and recycle gas. The components of raw gas include methane at about 94 mol %, ethane at about 4 mol %, nitrogen at about 1 mol %, small amounts of propane, butane, pentane, and hexane, and also $H_2S$ at 4 ppm-mol, COS at about 4 ppm-mol, $CS_2$ at about 2 ppm-mol, and $CH_4S$ at about 8 ppm-mol. The raw gas temperature at the input is about 77° F. and inlet pressure is about 350 psig. Blended gas can be used, and the components of blended gas include hydrogen at less than about 1 mol %, nitrogen at about 2 mol %, carbon dioxide at about 1 mol %, carbon monoxide at about 4 mol %, methane at about 84 mol %, ethane at about 4 mol %, argon at about 3 mol %, small amounts of propane, butane, pentane, and hexane, and also HCN at about 1.5 ppm-mol, $H_2S$ at about 4 ppm-mol, COS at about 3 ppm-mol, CS2 at about 2 ppm-mol, and $CH_4S$ at about 7 ppm-mol. The blended gas temperature at the input is about 144° F. and inlet pressure is about 465 psig.

The input gas stream, along with oxygen from the ASU and superheated steam are fed to an oxygen supplied partial oxidation reactor. Nitrogen gas from the ASU can be supplied to nitrogen compressor, and includes nitrogen at about 99.9 mol % with about 10 ppmv of oxygen, and 1 ppmv of water. The temperature of the nitrogen gas is about 120° F. and pressure is about 80 psig at the inlet of the compressor and is increased to about 298° F. and 1504 psig respectively.

The oxygen stream supplied to the oxygen supplied partial oxidation process include oxygen at about 93 mol %, nitrogen at about 3 mol %, and argon at about 4 mol %. The temperature of the oxygen supplied to the oxygen supplied partial oxidation process is about 70° F. and inlet pressure is about 525 psig. The inlet stream to the oxygen supplied partial oxidation process includes hydrogen at less than about 1 mol %, nitrogen at about 2 mol %, carbon dioxide at about 1 mol %, carbon monoxide at about 2 mol %, oxygen at about 38%, methane at about 50 mol %, ethane at about 2 mol %, argon at about 3 mol %, small amounts of propane, butane, pentane, and hexane, and also HCN at about 1 ppm-mol, $H_2S$ at about 2 ppm-mol, COS at about 2 ppm-mol, $CS_2$ at about 1 ppm-mol, and $CH_4S$ at about 4 ppm-mol. The temperature of the inlet stream to the oxygen supplied partial oxidation process is about 46° F. and inlet pressure is about 465 psig.

The non-catalytic exothermic reactions in the oxygen supplied partial oxidation process produce an outlet stream that includes hydrogen at about 50 mol %, nitrogen at about 2 mol %, carbon dioxide at about 2 mol %, carbon monoxide at about 31 mol %, water at about 12%, argon at about 2 mol %, and also $NH_3$ at about 300 ppm-mol, HCN at about 50 ppm-mol, and $H_2S$ at about 5 ppm-mol. The temperature of the outlet stream from the oxygen supplied partial oxidation process is about 1408° F. and pressure is about 435 psig.

The outlet stream from the oxygen supplied partial oxidation process is then supplied to the turbine expander. This inlet to the turbine expander includes hydrogen at about 34 mol %, nitrogen at about 1 mol %, carbon dioxide at about 1.5 mol %, carbon monoxide at about 21 mol %, water at about 40%, argon at about 1 mol %, and also NH3 at about 200 ppm-mol, HCN at about 33 ppm-mol, and $H_2S$ at about 4 ppm-mol. The temperature of the inlet stream to the turbine expander is about 1050 of and pressure is about 435 psig. The outlet stream from the turbine expander includes hydrogen at about 34 mol %, nitrogen at about 1 mol %, carbon dioxide at about 1.5 mol %, carbon monoxide at about 21 mol %, water at about 40%, argon at about 1 mol %, and also $NH_3$ at about 200 ppm-mol, HCN at about 33 ppm-mol, and $H_2S$ at about 4 ppm-mol. The temperature of the outlet stream from the turbine expander is about 680° F. and pressure is about 75 psig.

When the outlet product stream is supplied to a sulfur removal system, the inlet stream includes $H_2S$ at about 4 ppm-mol, and COS at about 0.1 ppm-mol. In the outlet stream from the sulfur removal process, $H_2S$ is present at about 0.007 ppm-mol, and COS at about 0.15 ppm-mol.

The outlet stream from the turbine expander or the sulfur removal process is then supplied to a high temperature shift reactor. This inlet stream to the high temperature shift reactor includes hydrogen at about 34 mol %, nitrogen at about 1 mol %, carbon dioxide at about 1.5 mol %, carbon monoxide at about 21 mol %, water at about 40%, argon at about 1 mol %, and also $NH_3$ at about 200 ppm-mol, HCN at about 33 ppm-mol, and $H_2S$ at about 4 ppm-mol. The temperature of the inlet stream to the high temperature shift reactor is about 680° F. and pressure is about 75 psig. The outlet stream from the high temperature shift reactor include hydrogen at about 48 mol %, nitrogen at about 1 mol %, carbon dioxide at about 15 mol %, carbon monoxide at about 7 mol %, water at about 27%, argon at about 1 mol %, and also $NH_3$ at about 200 ppm-mol, HCN at about 33 ppm-mol, and $H_2S$ at about 4 ppm-mol. The temperature of the outlet stream from the high temperature shift reactor is about 949° F. and pressure is about 70 psig.

The outlet product stream from a high temperature shift reactor can be supplied to one or more heat exchangers and then to a low temperature shift reactor. This inlet stream will include hydrogen at about 48 mol %, nitrogen at about 1 mol %, carbon dioxide at about 15 mol %, carbon monoxide at about 7 mol %, and water at about 27 mol %. The temperature of the inlet stream to the low temperature shift reactor is about 383° F. and pressure is about 50 psig.

The outlet stream from the low temperature shift reactor includes hydrogen at about 54 mol %, nitrogen at about 1 mol %, carbon dioxide at about 21 mol %, carbon monoxide at about 1 mol %, and water at about 21 mol %. The temperature of the outlet stream from the low temperature shift reactor is about 506° F. and pressure is about 46 psig. This stream is then supplied to one or more heat exchangers and/or condensers.

The inlet stream to the condenser includes hydrogen at about 54 mol %, nitrogen at about 1 mol %, carbon dioxide at about 21 mol %, carbon monoxide at about 1 mol %, and water at about 21 mol %. The temperature of the inlet stream to the low temperature shift reactor is about 199° F. and pressure is about 32 psig.

The outlet stream from the condenser that is fed to a condensate drum includes hydrogen at about 54 mol %, nitrogen at about 1 mol %, carbon dioxide at about 21 mol %, carbon monoxide at about 1 mol %, and water at about 21 mol %. The temperature of the outlet stream from the condenser is about 110° F. and pressure is about 28 psig.

The outlet stream from the condensate drum includes hydrogen at about 66 mol %, nitrogen at about 1 mol %, carbon dioxide at about 26 mol %, carbon monoxide at about 1.5 mol %, and water at about 2 mol %. The $NH_3$ concentration drops from about 200 ppm-mol to 5 ppm-mol, as it is removed as part of the sour water, but HCN remains in the product stream at about 25-30 ppm-mol. The temperature of the outlet stream from the condensate drum is about 110° F. and pressure is about 28 psig. This stream is then optionally fed into a syngas compressor.

The inlet stream to the syngas compressor includes hydrogen at about 70 mol %, nitrogen at about 1 mol %, carbon dioxide at about 23 mol %, carbon monoxide at about 1.5 mol %, and water at about 3 mol %. The temperature of the inlet stream to the syngas compressor is about 110° F. and pressure is about 28 psig. The outlet stream from the syngas compressor includes hydrogen at about 72 mol %, nitrogen at about 1 mol %, carbon dioxide at about 23 mol %, carbon monoxide at about 1.5 mol %, and water at about 0.5 mol %. The temperature of the outlet stream from the syngas compressor is about 226° F. and pressure is about 375 psig.

This product stream can be subjected to a waterwash to reduce the $NH_3$ and HCN from about 5 ppmv and 25-30 ppmv to about undetectable levels of $NH_3$ and about 5 ppmv of HCN respectively.

The product stream is then supplied to a carbon dioxide removal process. This inlet stream includes hydrogen at about 72 mol %, nitrogen at about 1 mol %, carbon dioxide at about 23 mol %, carbon monoxide at about 1.5 mol %, and water at about 0.5 mol %. The temperature of the inlet stream to the carbon dioxide removal process is about 118° F. and pressure is about 370 psig.

The hydrogen-rich outlet stream from the carbon dioxide removal process includes hydrogen at about 93 mol %, nitrogen at about 1.5 mol %, carbon monoxide at about 2 mol %, and water at about 0.5 mol %. The temperature of the outlet stream from the carbon dioxide removal process is about 128° F. and pressure is about 370 psig. The carbon dioxide-rich stream exiting the carbon dioxide removal process includes hydrogen at about 2 mol % and carbon dioxide at about 98 mol %. The temperature of this carbon dioxide-rich stream is about 120° F. and pressure is about 15 psig.

The outlet stream from the carbon dioxide removal process is supplied to a pressure swing absorption ("PSA") unit. The inlet stream to the PSA unit includes hydrogen at about 93 mol %, nitrogen at about 1.5 mol %, carbon monoxide at about 2 mol %, and water at about 0.5 mol %. The the temperature of the inlet stream to the PSA unit is about 90° F. and pressure is about 350 psig. The pure hydrogen stream exiting the PSA unit includes hydrogen at about 99.8 mol %, nitrogen at about 0.05 mol %, and argon at about 0.16 mol %. The negligible amounts of carbon dioxide and about 5 ppmv of carbon monoxide are present in this stream. The temperature of the inlet stream to the PSA unit is about 100° F. and pressure is about 340 psig. The pure hydrogen stream exiting the PSA unit can be further supplied to a compressor that increases the temperature and pressure of the stream to about 239° F. and 1504 psig. The PSA tail gas stream includes hydrogen at about 73 mol %, nitrogen at about 7 mol %, carbon monoxide at about 9 mol %, argon at about 8 mol %, and water at about 0.8 mol %. The temperature of the PSA tail gas stream is about 70° F. and pressure is about 5 psig. The PSA tail gas stream can be further supplied to a compressor that increases the temperature and pressure of the stream to about 113° F. and 181 psig.

The PSA tail gas stream is supplied to a membrane separator unit. The permeate stream following processing in the membrane separator includes hydrogen at about 95 mol %, nitrogen at about 1 mol %, carbon monoxide at about 2 mol %, argon at about 0.8 mol %, and water at about 0.6 mol %. The temperature of the permeate stream is about 60° F. and pressure is about 0.3 psig. The permeate stream can be further supplied to a compressor that increases the temperature and pressure of the stream to about 239° F. and 30 psig. The retentate stream includes hydrogen at about 5 mol %, nitrogen at about 24 mol %, carbon monoxide at about 32 mol %, argon at about 33 mol %, and methane at about 5 mol %. The temperature of the retentate stream is about 137° F. and pressure is about 172 psig. The retentate stream can be further supplied to a compressor that increases the temperature and pressure of the stream to about 213° F. and 465 psig.

The purge stream generated herein includes hydrogen at about 5 mol %, nitrogen at about 24 mol %, carbon monoxide at about 32 mol %, argon at about 33 mol %, and methane at about 5 mol %. The temperature of the purge stream is about 213° F. and pressure is about 465 psig.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention. Similarly, it is to be understood that that the mere use of the term "first" and "third" does not require that there be any "second" component. As used herein, singular forms "a", "an" and "the" include plural referents, unless the context clearly dictates otherwise.

What is claimed is:

1. A method for the production of hydrogen from synthesis gases of an oxygen supplied partial oxidation process, the method comprising the steps of:
    supplying a hydrocarbon or carbonaceous feedstock and oxygen to an oxygen supplied partial oxidation process to produce a synthesis gas, the synthesis gas comprising carbon dioxide, carbon monoxide, and hydrogen;
    supplying the synthesis gas to a first reactor, the first reactor comprising a catalyst and being configured to convert at least a portion of the carbon monoxide to carbon dioxide and produce a modified synthesis gas;
    supplying the modified synthesis gas to a second reactor, the second reactor comprising a catalyst and being configured to convert remaining carbon monoxide to carbon dioxide to produce a carbon dioxide-rich synthesis gas;
    supplying the carbon dioxide-rich synthesis gas from the second reactor to a first condenser to remove water and produce a gas stream comprising hydrogen and carbon dioxide;
    supplying the hydrogen and carbon dioxide stream to a pressure swing adsorption process to produce a pure hydrogen stream and pressure swing adsorption tail gas; and
    extracting exothermic heat for the production of power, heating and cooling of the process, or export of steam.

2. The method of claim 1, further comprising the step of: supplying the pure hydrogen stream and nitrogen gas from an air separation unit to a fourth reactor, the fourth reactor comprising a catalyst and being configured to produce an ammonia product stream.

3. The method of claim 1, further comprising the step of: supplying the pure hydrogen stream as a feedstock to a Fischer Tropsch process.

4. The method of claim 1, further comprising the step of: supplying the synthesis gas or modified synthesis gas to a soot removal process to remove soot.

5. The method of claim 1, further comprising the step of: supplying at least one of the hydrocarbon or carbonaceous feedstock, the synthesis gas, or the modified synthesis gas to a desulfurization process.

6. The method of claim 1, further comprising the step of: supplying the gas stream comprising hydrogen and carbon dioxide to an amine separator unit to produce a residual pure carbon dioxide stream and amine treated high hydrogen content stream.

7. The method of claim 1, further comprising the step of: supplying the gas stream comprising hydrogen and carbon dioxide from the first condenser to a vacuum pressure swing adsorption process to produce a pure carbon dioxide stream and a high hydrogen content stream.

8. The method of claim 1, further comprising the step of: supplying the pure hydrogen stream to a third reactor, the third reactor comprising a catalyst and being configured for the production of methane from the carbon monoxide and carbon dioxide present in the hydrogen stream, the third reactor producing a methane product stream and a high purity hydrogen stream.

9. The method of claim 1, wherein the oxygen has a purity of at least 93%.

10. The method of claim 1, wherein the composition of the gas stream comprising hydrogen and carbon dioxide comprises between 65-80% hydrogen, between 20-35% carbon dioxide and between 0-8% carbon monoxide.

11. The method of claim 1, wherein the first and second reactor are replaced with one or three reactors.

12. The method of claim 1, wherein at least one gas or tail gas is purged to atmosphere, a fuel cell, or a thermal oxidizer.

13. The method of claim 2, further comprising the step of: utilizing a hydrogen generator, wherein the hydrogen generator produces hydrogen and oxygen from a water feedstock, wherein the hydrogen is supplied to the fourth reactor and the oxygen is supplied to the oxygen supplied partial oxidation process.

14. The method of claim 1, further comprising the step of: supplying the pure hydrogen stream to a process selected from the group consisting of a process for the production of urea, ammonium nitrate, nitric acids, diesel exhaust fluids, mixed alcohols; production of aldehyde alcohols, ethanol, methanol, methyl tert-butyl ether, acetic acid, olefins, synthetic diesel, gasoline, gasoline additives, and dimethyl ether.

15. The method of claim 6, wherein the amine separator unit is a multi-pressure system with one or more carbon dioxide outputs and one or more amine regeneration processes.

16. The method of claim 1, further comprising the step of: supplying the gas stream comprising hydrogen and carbon dioxide to a demineralized water wash system to decrease concentration of ammonia and hydrogen cyanide in the gas stream comprising hydrogen and carbon dioxide to below 5 parts per million by volume.

17. The method of claim 1, further comprising the step of: recycling the water removed by the first condensor.

18. The method of claim 1, further comprising utilizing an air separation unit to allow for cold gases within the method to be used as a heat sink in the method.

19. The method of claim 2, further comprising the step of: utilizing an ammonia refrigeration unit cold gas exit temperature for a heat sink.

20. The method of claim 1, wherein the pressure swing adsorption tail gas is recycled to the first reactor.

* * * * *